United States Patent Office 3,519,675
Patented July 7, 1970

---

3,519,675
1,2-DIPHENYL-3,4-DIHYDRONAPHTHALENES AND 2,3-DIPHENYLINDENES
Daniel Lednicer, Kalamazoo, Mich., assignor to The Upjohn Company, Kalamazoo, Mich., a corporation of Delaware
No Drawing. Original application June 1, 1964, Ser. No. 371,828, now Patent No. 3,320,271. Divided and this application Oct. 10, 1966, Ser. No. 585,244
Int. Cl. C07c 69/76
U.S. Cl. 260—473                     5 Claims

---

ABSTRACT OF THE DISCLOSURE

This invention is a group of new organic compounds of the formula:

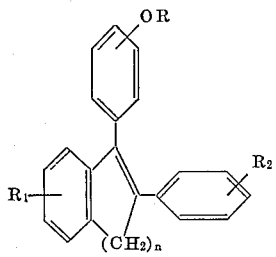

wherein R is —$C_nH_{2n}$—$COOR_5$ wherein $C_nH_{2n}$ represents alkylene from 1 to 12 carbon atoms, inclusive, and $R_5$ is selected from the class consisting of hydrogen and lower-alkyl; $R_1$ and $R_2$ are each selected from the class consisting of hydrogen, lower-alkyl, lower-alkenyl, lower-alkoxy, lower-alkenyloxy, halogen, trifluoromethyl, lower-alkylmercapto, and

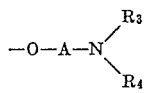

wherein A is an alkylene group containing from 2 to 6 carbon atoms, inclusive, and $R_3$ and $R_4$ are selected from the class consisting of lower-alkyl and lower-alkyl linked together to form, with the attached nitrogen atom, a 5 to 7 ring atom saturated heterocyclic radical; and $n$ is an integer from 1 to 2, inclusive. These novel compounds and their salts possess activity as antifertility, estrogenic, antiestrogenic, antispermatogenic, fungicidal, and blood cholesterol lowering agents, and are useful for those purposes.

---

This is a division of copending application Ser. No. 371,827, filed June 1, 1964, now U.S. Pat. No. 3,320,271.

This invention relates to novel derivatives of 1,2-diphenyl - 3,4 - dihydronaphthalenes and 2,3 - diphenylindenes and is more particularly concerned with novel ethers of 1-(hydroxyphenyl)-2-phenyl-3,4-dihydronaphthalenes and 2-phenyl-3-(hydroxyphenyl) - indenes and with substituted derivatives thereof, and with processes for their preparation.

The novel compounds of the invention can be represented by the following formula:

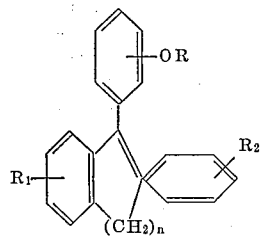           (I)

wherein R is selected from the class consisting of:
(i) Lower-alkyl substituted by a radical selected from the class consisting of dihydroxyalkyl from 2 to 5 carbon atoms, inclusive, epoxyalkyl from 2 to 8 carbon atoms, inclusive, 1 - hydroxy - 2 - aminoethyl, 5-(2-thioxooxazolidinyl)-, 5-(2-oxooxazolidinyl)-, and

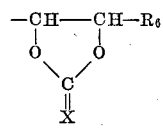

wherein $R_6$ is selected from the class consisting of hydrogen and lower-alkyl, and X is selected from the class consisting of oxygen and sulfur; and
(ii) —$C_nH_{2n}$—$COOR_5$ wherein $C_nH_{2n}$ represents alkylene from 1 to 12 carbon atoms, inclusive, and $R_5$ is selected from the class consisting of hydrogen, and lower-alkyl;
$R_1$ and $R_2$ are each selected from the class consisting of hydrogen, lower-alkyl, lower-alkenyl, lower-alkoxy, lower-alkenyloxy, halogen, trifluoromethyl, lower-alkylmercapto, and

wherein A is an alkylene group containing from 2 to 6 carbon atoms, inclusive, and $R_3$ and $R_4$ are selected from the class consisting of lower-alkyl and lower-alkyl linked together to form, with the attached nitrogen atom, a 5 to 7 ring atom saturated heterocyclic radical; and $n$ is an integer from 1 to 2, inclusive.

The term "lower-alkyl" means an alkyl group containing from 1 to 8 carbon atoms, inclusive, such as methyl, ethyl, propyl, butyl, pentyl, hexyl, heptyl, octyl, and isomeric forms thereof. The term "lower-alkenyl" means an alkenyl group containing from 3 to 8 carbon atoms, inclusive, such as allyl, butenyl, pentenyl, hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, pentyloxy, hexyloxy, heptyloxy, octyloxy, and isomeric forms thereof. The term "lower-alkenyloxy" means an alkenyloxy group containing from 3 to 8 carbon atoms, inclusive, such as allyloxy, butenyloxy, pentenyloxy, hexenyloxy, heptenyloxy, octenyloxy, and isomeric forms thereof. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, pentylmercapto, hexylmercapto, heptylmercapto, octylmercapto, and isomeric forms thereof. The term "alkylene group containing from 2 to 6 carbon atoms, inclusive" includes ethylene, propylene, butylene, pentylene, hexylene, and isomeric forms thereof. The term "lower-alkyl linked together to form, with the attached nitrogen atom, a 5 to 7 ring atom saturated heterocyclic radical," is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, homomorpholino, and the like.

The term "dihydroxyalkyl from 2 to 5 carbon atoms, inclusive," means an alkyl radical containing from 2 to 5 carbon atoms which is substituted by two hydroxy groups, for example: 1,2-dihydroxyethyl, 1,2-dihydroxypropyl, 2,3-dihydroxypropyl, 1,3-dihydroxypropyl, 2,3-dihydroxybutyl, 2,4-dihydroxypentyl, and the like. The term "epoxyalkyl from 2 to 8 carbon atoms, inclusive," means an alkyl group containing from 2 to 8 carbon atoms having an epoxy substituent, for example, epoxyethyl, 1,2-epoxypropyl, 2,3-epoxybutyl, 4,5-epoxypentyl, 1,2-epoxyhexyl, 2,3-epoxyheptyl, 1,2-epoxyoctyl, and isomeric forms thereof. The term "alkylene from 1 to 12 carbon atoms, inclusive," embraces methylene, ethylene, propylene, butylene, pentylene, hexylene, heptylene, octylene, nonylene, decylene, undecylene, dodecylene, and isomeric forms thereof.

The compounds of the invention having the Formula I wherein $R_1$ and/or $R_2$ represents a tertiaryaminoalkoxy substituent can also exist in the form of acid addition salts and quaternary ammonium salts; and the compounds having the Formula I wherein R represents lower-alkyl substituted by 1-hydroxy-2-aminoethyl can likewise exist in the form of acid addition salts. Said acid addition salts comprise the salts of the free bases of Formula I

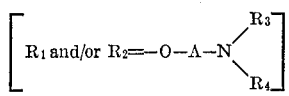

and [R=lower-alkyl substituted by 1-hydroxy-2-aminoethyl] with pharmacologically acceptable acids such as sulfuric, hydrochloric, nitric, phosphoric, lactic, benzoic, methanesulfonic, p - toluenesulfonic, salicylic, acetic, propionic, maleic, malic, tartaric, citric, cyclohexanesulfamic, succinic, nicotinic, ascorbic acids, and the like. Said quarternary ammonium salts comprise salts obtained by reacting the free bases of Formula I

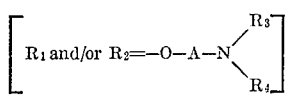

with quaternating agents, for example, lower-alkyl halides, lower-alkenyl halides, di(lower-alkyl) sulfates, aralkyl halides, lower-alkyl arylsulfonates, and the like. The terms "lower-alkyl" and "lower-alkenyl" have the significance hereinbefore defined. The term "aralkyl" measn an aralkyl group containing from 7 to 13 carbon atoms, inclusive, such as benzyl, phenethyl, phenylpropyl, benzhydryl, and the like. The term "lower-alkyl" arysulfonates" means the esters formed from lower alkanols and arylsulfonic acids such as benzenesulfonic, toluenesulfonic, xylenesulfonic, and like acids. Examples of quaternary ammonium salts of the basic compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl p-toluenesulfonate, ethyl p-toluenesulfonate, and the like.

The term "novel compounds of the invention" as used throughout the specification embraces the compounds of Formula I; the acid addition and quaternary ammonium salts of those compounds of Formula I wherein $R_1$ and/or $R_2$ represents

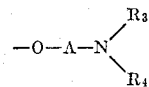

wherein A, $R_3$ and $R_4$ are as hereinbefore defined; and the acid addition salts of those compounds of Formula I wherein R represents lower-alkyl substituted by 1-hydroxy-2-aminoethyl.

The novel compounds of the invention exhibit biological activity. Thus, the novel compounds of the invention posses activity as antifertility, estrogenic, antiestrogenic, antispermatogenic, fungicidal, and blood cholesterol lowering agents. Illustratively, the compounds 1 - [p - 2,3 - dihydroxypropoxy)phenyl] - 2 - phenyl - 6-methoxy-3,4-dihydronaphthalene and the cyclic carbonate thereof, 1 -[p-(3 - amino - 2 - hydroxypropoxy)phenyl] - 2-phenyl-6-methoxy-3,4-dihydronaphthalene hydrochloride, Ethyl 2 - [p - (3,4 - dihydro - 6 - methoxy - 2 - phenyl-1-naphthyl)phenoxy]-2-methylpropionate, 5 - [p - (3,4 - dihydro - 6 - methoxy-2-phenyl-1-naphthyl) phenoxy]methyl-2-oxazolidinethione, and 1 - [p - (2,3 - epoxypropoxy)phenyl] - 2 - phenyl-6-methoxy-3,4-dihydronaphthalene exhibit oral antifertility activity in rats when tested by the method described by Duncan et al., Proc. Soc. Exp. Biol. Med. 112, 439–442, 1963.

The ethers of the invention possess improved therapeutic ratio compared with the corresponding phenols (I; R=H) described in copending application Ser. No. 292,-767, filed July 3, 1963.

The novel compounds of the invention are also valuable for animal pest control. For example, the compounds of the invention are formulated in combination with baits and/or attractants and placed in feeding stations accessible to undesirable rodents and other small animals and birds such as startlings, gulls, and the like, thus reducing hazards to aviation by their presence on runways and in the vicinity of airfields.

For purposes of administration to mammals, including man and animals of economic value, such as horses, cattle, sheep, pigs, mice, rats, rabbits, and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

In addition to their biological activity, the basic compounds of the invention are also useful as intermediates. Illustratively, the compounds of Formula I wherein one or more of the groups R, $R_1$, and $R_2$ is basic can be reacted with fluosilicic acid to form the fluosilicate salts which in dilute aqueous solution are effective mothproofing agents as more fully disclosed in U.S. Pats. Nos. 2,075,-359 and 1,915,334.

The novel compounds of the invention having the Formula I can be prepared by alkylation of the corresponding free hydroxy compounds (I: H=R), using procedures known in the art for the etherification of phenols.

For example, the compounds of Formula I wherein R represents —$C_nH_{2n}$—$COOR_5$ wherein $C_nH_{2n}$ and $R_5$ have the significance hereinbefore defined, can be prepared by reaction of the corresponding free phenol (I; R=H) in the form of an alkali metal salt such as the sodium or potassium salt, with the appropriate halo ester Hal—$C_nH_{2n}$—$COOR_5$ wherein Hal represents halogen, $R_5$ is lower-alkyl and $C_nH_{2n}$ is as hereinbefore defined. The reaction is carried out advantageously in an inert organic solvent such as tetrarahydrofuran, dimethylformamide, benzene, toluene, xylene, and the like, using conditions conventional in the art for such alkylations. The carbalkoxyalkyl ether so obtained is isolated by conventional procedures, for example, by solvent extraction, and is purified by chromatography, recrystallization, and like procedures. The carbalkoxyalkyl ether so obtained is hydrolyzed to the corresponding carboxyalkyl ether using procedures known in the art for the hydrolysis of carboxylic acid esters, for example, by treatment with aqueous or alcoholic alkali metal hydroxides.

Similarly, the compounds of the invention having the Formula I wherein R represents dihydroxyalkyl-loweralkyl or epoxyalkyl-lower-alkyl as hereinbefore defined can be prepared by alkylating the corresponding phenol (I; R=H) with the appropriate dihydroxyalkyl halide or epoxyalkyl halide in the presence of a base such as sodium hydroxide, sodium methoxide, and the like. The alkylation is conducted advantageously in an inert organic solvent such as tetrahydrofuran, dioxane, a loweralkanol, for example, methanol, ethanol, isopropyl alcohol, and the like. The desired ether is isolated from the reaction mixture by conventional procedures such as solvent extraction and purified by chromatography, recrystallization, and the like.

The compounds so obtained wherein R represents lower-alkyl substituted by epoxyethyl, can be reacted with succinimide in the presence of a base such as pyridine, piperidine, N-methylpiperidine, and the like, whereby the epoxy ring is opened and the corresponding (2-succinimido-1-hydroxyethyl)-lower-alkyl ether is obtained. The latter compound is subjected to alkaline hydrolysis, for example, using aqueous or alcoholic sodium or potassium hydroxide, to yield the corresponding compound of Formula I wherein R is lower-alkyl substituted by a 2-amino-1-hydroxyethyl group.

The latter compounds are converted to the corresponding compounds wherein R represents lower-alkyl substituted by 5-(2-thioxooxazolidinyl)—, by reaction with carbon disulfide in the presence of a base such as potassium hydroxide, sodium hydroxide, potassium carbonate, and the like. The procedure employed is advantageously that described in the art for the preparation of 2-oxazolidinethiones; see, for example, Bruson et al., J. Am. Chem. Soc. 59, 2011, 1937. The reaction is preferably conducted in the presence of an inert organic solvent such as tetrahydrofuran, dioxane, ethanol, isopropyl alcohol, and the like. Elevated temperatures, e.g., the reflux temperature of the reaction mixture, are advantageously employed in the condensation.

Similarly the compounds of Formula I wherein R represents lower-alkyl substituted by 5-(2-oxooxazolidinyl)— are prepared from the appropriate compounds wherein R represents lower-alkyl substituted by 2-amino-1-hydroxyethyl, by reacting the latter compounds with ethyl chloroformate, phosgene, or dialkyl carbonate in the presence of a base using procedures known in the art.

The compounds of Formula I wherein R represents lower-alkyl substituted by the radical

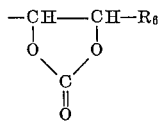

wherein $R_6$ is as hereinbefore defined, are prepared by a number of alternate routes from the corresponding $\alpha,\beta$-glycol, i.e., the corresponding compound, prepared as described above, in which R is lower-alkyl substituted by

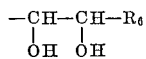

wherein $R_6$ is as hereinbefore defined.

For example, the corresponding $\alpha,\beta$-glycol can be reacted with a dialkyl carbonate, for example, diethyl carbonate, diisopropyl carbonate, dibutyl carbonate, dioctyl carbonate and the like, in the presence of a catalytic amount of a tertiary organic amine such as pyridine, triethylamine, triisopropylamine, N-methylpiperidine, N-ethylpiperidine, N,N-dimethylaniline and the like. Alternatively, the corresponding $\alpha,\beta$-glycol can be reacted with phosgene in the presence of an acid acceptor such as calcium carbonate or a tertiary organic amine as exemplified above. In yet another alternative preparation of the above carbonates the corresponding $\alpha,\beta$-glycol can be reacted with a lower-alkyl chloroformate such as ethyl chloroformate, butyl chloroformate, octyl chloroformate and the like in the presence of a tertiary organic amine as exemplified above, followed by treatment of the resulting product with an alkali metal hydride such as lithium hydride, sodium hydride, potassium hydride and the like or an alkali metal amide such as sodamide, potassium amide, and the like. Whichever method is employed, the procedure and reaction conditions are advantageously those which are well-known in the art for the preparation of cyclic carbonates of $\alpha,\beta$-glycols.

The thionocarbonates, i.e., compounds of Formula I wherein R represents lower-alkyl substituted by the radical

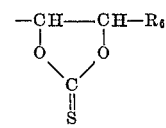

wherein $R_6$ is as hereinbefore defined, are prepared by reacting the corresponding $\alpha,\beta$-glycol, as above defined, with thiocarbonyldiimidazole using the procedure described in J. Am. Chem. Soc. 85, 2677, 1963.

Both the carbonates and thionocarbonates prepared as described above are isolated from the various reaction mixtures using conventional procedures such as solvent extraction and are purified by routine methods such as recrystallization, chromatography, and the like.

The various alkylating agents used in preparing the compounds of the invention by the procedures described above are, for the most part, well known in the art and/or can be prepared by procedures which are themselves well known in the art. Thus the halo esters $$\text{Hal}—\text{C}_n\text{H}_{2n}—\text{COOR}_5$$

wherein $R_5$ is lower-alkyl, and Hal and $C_nH_{2n}$ are as hereinbefore defined, can be prepared by esterification of the appropriate halo acids, which latter can be prepared, for example, by the methods summarized in Chemistry of Carbon Compounds, vol. 1A, pp. 615 to 617, edited by E. H. Rodd, Elsevier Publishing Company, New York, 1951.

The dihydroxyalkyl halides employed in the above-described alkylations can also be prepared by methods well known in the art. For example, the $\alpha,\beta$-dihydroxyalkyl halides can be prepared by the following sequence of reactions beginning with a halo ester prepared as described above:

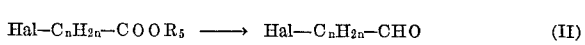 (II)

 (III)

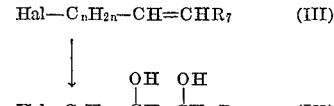 (IV)

wherein $R_5$ is lower-alkyl, and $R_7$ is hydrogen or lower-alkyl. In the above reaction sequence the starting halo ester is reduced, for example, using diisobutyl aluminum hydride or like reducing agents, to the corresponding halo aldehyde (II) which is then condensed with the appropriate alkylidene triphenylphosphorane $R_7CH=P(C_6H_5)_3$ wherein $R_7$ has the significance hereinbefore defined. The latter condensation is carried out advantageously using the procedure described by Wittig et al., Berichte 88, 1654, 1955. The halo olefin (III) so obtained is then oxidized, using for example, osmium tetroxide, potassium permanganate and like oxidizing agents, to yield the desired $\alpha,\beta$-dihydroxyalkyl halide (IV).

The $\alpha,\gamma$-dihydroxyalkyl halides employed as alkylating agents in the process of the invention can be prepared from the halo aldehydes (II), obtained as described above, using the following series of reactions:

$$Hal-C_nH_{2n}-CHO + Hal-CH_2-COOR_5$$

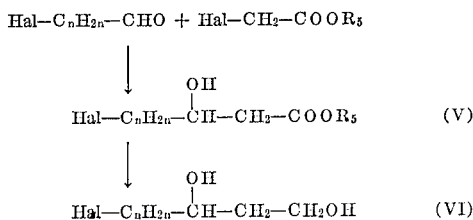

wherein $R_5$ is lower-alkyl. In the above reaction the halo aldehyde (II) is condensed with the appropriate haloacetic ester to yield the corresponding β-hydroxy ester (V) using the reaction conditions normally employed in the Reformatsky reaction: cf. R. L. Shriner, Organic Reactions I, p. 1 (New York, 1942). The β-hydroxy ester (V) is then reduced using, for example, lithium aluminum hydride, diisobutyl aluminum hydride, and like agents known in the art for the conversion of carboxylic ester groups to primary alcohol groups, to obtain the desired α,γ-dihydroxyalkyl halide (VI).

The epoxyalkyl halides which are employed as alkylating agents in the process of the invention can be prepared by epoxidation of the halo olefins (III) prepared as described above. The epoxidation is carried out conveniently by direct oxidation of the olefin using a peracid, for example, perbenzoic acid, peracetic acid, monoperphthalic acid, and the like. Alternatively, the haloolefins (III) can be reacted with a hypohalous acid, preferably hypobromous or hypochlorous acid, to form the corresponding halohydrin and the latter is then subjected to dehydrohalogenation using a base, for example, an alkali metal hydroxide, to form the corresponding epoxide.

The phenols (I; R=H) which are used as starting materials in the preparation of the ethers of the invention are prepared according to the procedures described in copending application Ser. No. 292,767, filed July 3, 1963. The procedures, which are there described and exemplified in detail, can be summarized as follows:

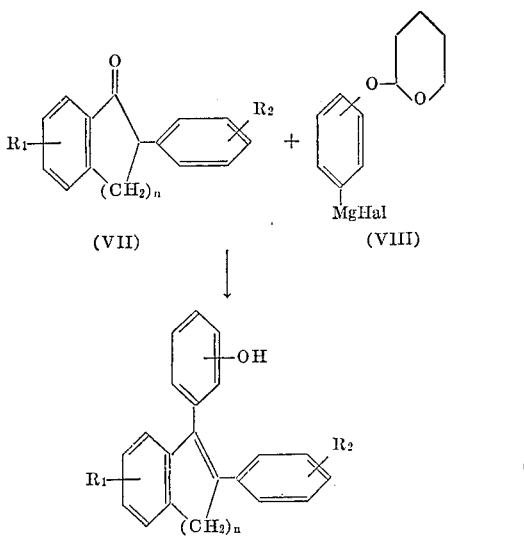

In the above Formulae $R_1$, $R_2$ and $n$ have the significance hereinbefore defined and Hal represents halogen.

In the above reaction, the ketone (VII) is reacted with the Grignard reagent (VIII) under conditions conventionally employed in conducting Grignard reactions. Thus, the reaction is carried out under anhydrous conditions, advantageously in the presence of an inert solvent such as dibutyl ether, diisopropyl ether, tetrahydrofuran, and the like. The preferred solvent is tetrahydrofuran. The reaction can be carried out at temperatures within the range of about 0° C. to about the boiling point of the solvent employed and is preferably carried out at elevated temperatures, for example, at or near the boiling point of the reaction mixture.

The reaction time varies within wide limits according to the temperature at which the reaction is conducted. Generally speaking, where the reaction is carried out at elevated temperatures such as the boiling point of the reaction mixture, it is necessary to employ a reaction time of the order of several hours to ensure completion of the reaction.

The Grignard reagent (VIII) employed in the reaction is formed from the tetrahydropyranyl ether of the appropriate halophenol and the tetrahydropyranyl ether group is still present in the reaction product obtained in the above-described reaction. The desired compound (I; R=H) can either be isolated as its tetrahydropyranyl ether and the latter group subsequently removed, or the ether grouping can be removed during the isolation procedure. In either event, the grouping is readily converted to a free hydroxy group by mineral acid hydrolysis. Preferably the ether group is hydrolyzed during the working-up procedure.

For example, the reaction mixture from the above-described Grignard reaction is decomposed by the addition of water, ammonium chloride, and the like, followed by separation of the organic layer and removal of the solvent therefrom. The residue [the tetrahydropyranyl ether of (I; R=H)] is then hydrolyzed, advantageously by allowing to stand in solution in a suitable inert organic solvent such as acetone, methanol, ethanol, or mixtures thereof with water, in the presence of aqueous mineral acid such as hydrochloric acid, hydrobromic acid, and the like.

The desired compound (I; R=H) is isolated from the hydrolysis mixture by conventional procedures, for example, by solvent extraction and is purified, if desired, by conventional procedures, for example, by chromatography, recrystallization, and the like.

In some cases, the desired compound (I; R=H) produced in the above-described reaction, is contaminated with appreciable quantities of the corresponding carbinol having the formula:

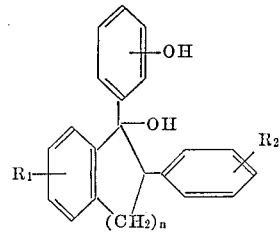

wherein $R_1$, $R_2$ and $n$ have the significance above defined. Where such a mixture of the desired compound (I; R=H) and the corresponding carbinol are obtained, said mixture can be treated by procedures known to effect the dehydration of a tertiary carbinol whereby the carbinol is converted to the desired compound (I; R=H). The dehydration can be effected in most instances by heating the carbinol in a solvent such as benzene, toluene, xylene, and the like, which forms an azeotrope with water, in the presence of a strong acid such as hydrochloric, sulfuric, p-toluenesulfonic acids, and the like. The water which is formed in the dehydration is removed from the reaction mixture azeotropically. There is thereby obtained a solution of the desired compound (I; R=H) from which the latter can be isolated by evaporation or other conventional procedures. In certain cases, the dehydration of the carbinol requires more drastic conditions such as heating the compound at, or slightly above, its melting point, preferably in the presence of an inert gas, until elimination of water is complete.

The Grignard reagents (VIII) employed as starting materials in the above-described process are prepared by reaction of magnesium in an anhydrous inert organic solvent such as dibutyl ether, diisopropyl ether, tetrahydrofuran, and the like, with the appropriate halophenol in the form of its tetrahydropyranyl ether, using procedures well known in the art for the preparation of Grignard reagents. The halophenol tetrahydropyranyl ether is obtained from the halophenol by treating the latter with 2,3-dihydropyran in the presence of a trace of p-toluenesulfonic acid or a mineral acid such as hydrochloric acid, hydrobromic acid, and the like.

The ketones (VII) which are employed as starting materials in the above-described process are prepared as follows. Those ketones (VII) wherein $n$ is 1, i.e., those compounds of Formula VII which are indanones, except those wherein $R_1$ and/or $R_2$ represent alkenyloxy or

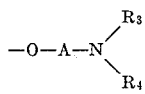

as defined above, can be prepared according to the following reaction scheme:

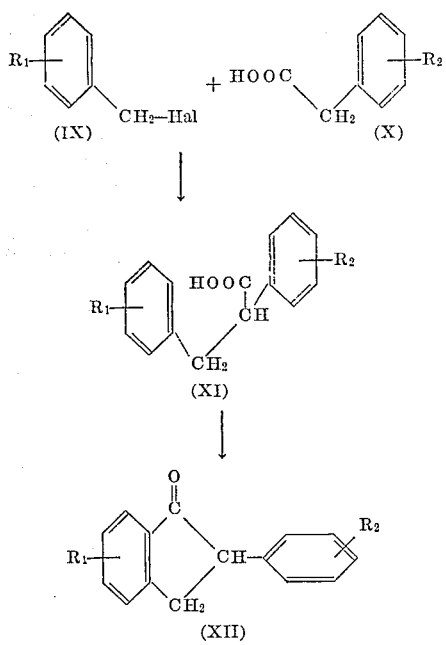

in the above formulae $R_1$ and $R_2$ have the significance hereinbefore defined, with the exceptions noted above, and Hal represents halogen. It is to be noted that the benzyl halide (IX) must be unsubstituted in at least one of the ortho positions in order that the compound (XI) can be cyclized as described below. The reaction of the phenylacetic acids (X) with the benzyl halides (IX) to give the corresponding α-phenylhydrocinnamic acids (XI) can be effected, for example, using the procedure described by Hauser and Chambers, J. Am. Chem. Soc. 78, 4942, 1956, for the preparation of α-phenylhydrocinnamic acid from phenylacetic acid and benzyl chloride. The α-phenylhydrocinnamic acids (XI) can also be prepared by Perkin condensation of a phenylacetic acid (X) with the appropriately substituted benzaldehyde followed by reduction of the intermediate α-phenylcinnamic acid so obtained. The procedure employed in this alternative synthesis is preferably that described by Solmssen, J. Am. Chem. Soc. 65, 2370, 1943.

The α-phenylhydrocinnamic acids (XI) so obtained are then cyclized to the required indanones (XII) in the presence of a Lewis acid, using the general procedure described by Fieser and Hershberg, J. Am. Chem. Soc. 61, 1272, 1939. The term "Lewis acid" is well known in the art and is defined succinctly by Fieser and Fieser, "Organic Chemistry," third edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the α-phenylhydrocinnamic acids (XI) according to the above procedure comprises adding the acid (XI) to liquid hydrogen fluoride with stirring and then allowing the hydrogen fluoride to evaporate at room temperature. The desired indanone (XII) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The indanone (XII) so obtained can be purified, if desired, by conventional procedures, for example, by distillation.

The indanones of Formula XII wherein $R_1$ and/or $R_2$ represents alkenyloxy can be prepared conveniently by alkenylation of the corresponding compounds wherein $R_1$ and/or $R_2$ represents hydroxy. The latter can be obtained by dealkylation of the corresponding alkoxy compounds using conventional methods, for example, by heating with aluminum chloride or bromide in the presence of an inert solvent such as benzene, xylene, and the like. The alkenylation of the hydroxy compounds so produced can be effected using conventional procedures, for example, by reacting the free hydroxy compound with the appropriate alkenyl halide in the presence of a base such as potassium carbonate, sodium methoxide, and the like.

The indanones (XII) wherein $R_1$ and/or $R_2$ represents

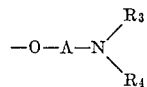

wherein A, $R_3$ and $R_4$ are as hereinbefore defined, can be obtained from the corresponding free hydroxy compounds by reaction of the latter with the appropriate tertiary-aminoalkyl halide,

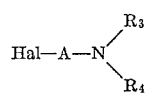

wherein $R_3$, $R_4$, A, and Hal are as hereinbefore defined. The etherification is conducted advantageously in an inert solvent such as a lower-alkanol, for example, methanol, ethanol, isopropyl alcohol, and the like, in the presence of a base such as potassium carbonate, sodium hydroxide, sodium methoxide, and the like.

The benzyl halides (IX) which are employed as starting materials in the above-described preparation, many of which are known in the art, can themselves be prepared from the correspondingly substituted benzoic acids, for example, by reduction of said acids or simple alkyl esters thereof, for example, with lithium aluminum hydride according to the procedure described by Nystrom and Brown, J. Am. Chem. Soc. 69, 2548, 1947. The benzyl alcohols so obtained are then converted to the corresponding benzyl halides (IX) using procedures known in the art, for example, that described by Gilman and Kirby, J. Am. Chem. Soc. 51, 475, 1929.

The phenylacetic acids (X), which are employed as starting materials in the above-described preparation, many of which are known in the art (see, for example, Corse et al., J. Am. Chem. Soc. 70, 2837, 1948) can themselves be prepared from the correspondnig benzyl halides (IX) by procedures well known in the art. For example, the benzyl halides (IX) can be reacted with an alkali metal cyanide, such as sodium cyanide, to form the corresponding benzyl cyanide which latter is then hydrolyzed, for example, using an aqueous mineral acid or aqueous alkali, to yield the desired phenylacetic acid (X). A suitable procedure for carrying out the conversion of the benzyl halide (IX) to the phenylacetic acid (X) is that described by Silverman and Bogert, J. Org. Chem. 11, 34, 1946.

The starting ketones of Formula VII wherein $n$ is 2, i.e., the compounds of Formula VII which are α-tetralones, except those wherein $R_1$ and/or $R_2$ is alkenyloxy or

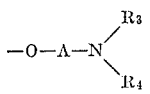

as defined above, can be prepared according to the following reaction scheme:

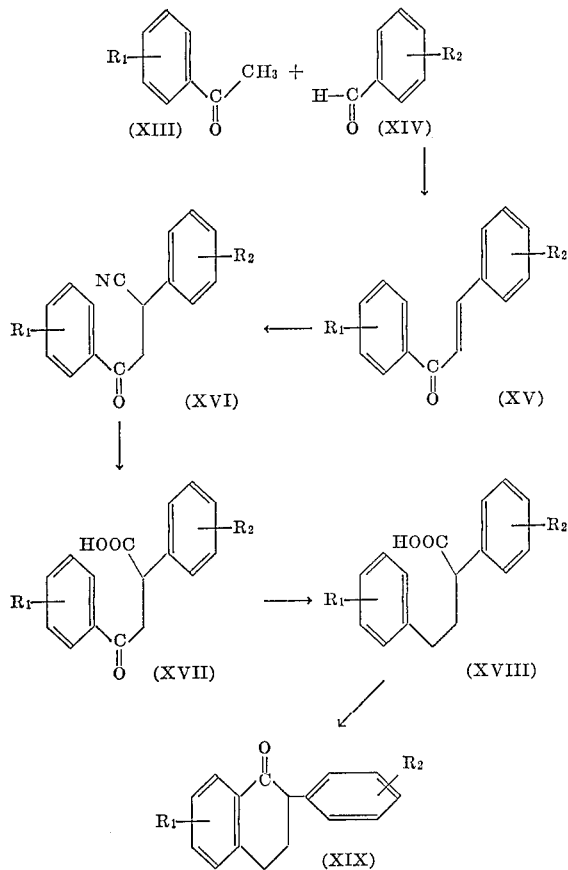

In the above reaction sequence, $R_1$ and $R_2$ have the significance hereinbefore defined with the exceptions noted above.

In the above reaction sequence, the appropriately substituted acetophenone (XIII) is condensed with the appropriately substituted benzaldehyde (XIV) to produce the corresponding chalcone (XV) under conditions conventionally employed in the preparation of chalcones, for example, by condensation of (XIII) and (XIV) in the presence of a base such as sodium hydroxide, potassium hydroxide, and the like, in an inert solvent such as a mixture of water and a lower alkanol, for example, methanol, ethanol, and the like. The reaction is generally conducted at or below room temperature with external cooling as required. The chalcone (XV) is isolated from the reaction mixture and purified by conventional procedures, for example, by solvent extraction followed by distillation, in the case of a liquid product, or recrystallization in the case of a solid product.

The chalcone (XV) so obtained is then converted to the corresponding nitrile (XVI) by reaction with hydrogen cyanide, for example, by treatment with an alkali metal cyanide such as potassium cyanide, sodium cyanide, and the like, in the presence of acetic acid and an inert solvent such as aqueous methanol, aqueous ethanol, and the like, using the procedure described by Newman, J. Am. Chem. Soc. 60, 2947, 1938 for the conversion of benzalacetophenone (chalcone) to α-phenyl-β-benzoylpropionitrile. The desired nitrile (XVI) generally separates from the reaction mixture as a solid and can be insolated by filtration and purified by recrystallization.

The nitrile (XVI) so obtained is hydrolyzed to the corresponding keto acid (XVII) by conventional procedures for the hydrolysis of nitriles, for example, by heating under reflux in the presence of aqueous mineral acid such as sulfuric acid until hydrolysis is substantially complete. The desired acid (XVII) generally separates from the reaction mixture as a solid and is isolated by filtration and purified by recrystallization or by other conventional procedures, for example, by conversion to an alkali metal salt followed by acidification of the latter to regenerate the free acid.

The keto acid (XVII) so obtained is then subjected to reduction to form the corresponding acid (XVIII). The reduction can be effected using any of the methods customarily employed for the conversion of a keto group to a methylene group. A particularly suitable reducing agent is amalgamated zinc and treatment of the keto acid (XVII) with amalgated zinc in the presence of a mineral acid affords the desired acid (XVIII) in excellent yield. The acid (XVIII) can be isolated from the reaction mixture by conventional procedures, for example, by decantation of the liquid reaction mixture, followed by solvent extraction of the decanted liquid and evaporation of the solvent. Generally speaking the acid (XVIII) so obtained is sufficiently pure to be used in the next step of the synthesis without further treatment. If desired, however, the acid (XVIII) so obtained can be purified by conventional procedures, for example, by distillation in the case of a liquid or recrystallization in the case of a solid, or by conversion to an alkali metal salt followed by acidification of the latter to yield the free acid.

In the final stage of the synthesis the acid (XVIII) is cyclized to the required α-tetralone (XIX) in the presence of a Lewis acid, as defined above, using the general procedure described by Fieser and Hershberg, supra. The preferred Lewis acid for use in the above process is hydrogen fluoride.

A particularly convenient method of cyclizing the acid (XVIII) according to the above procedure comprises adding the acid (XVIII) to liquid hydrogen fluoride with stirring and then allowing the hydrogen fluoride to evaporate at about 20–30° C. The desired α-tetralone (XIX) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (XIX) so obtained can be purified, if desired, by conventional procedures, for example, by recrystallization.

Alternatively, the acid (XVIII) can be cyclized to the α-tetralone (XIX) by conversion of the acid (XVIII) to the corresponding acid chloride and treatment of the latter with aluminum chloride or stannic chloride according to the procedure described by Fieser et al., J. Am. Chem. Soc. 60, 170, 1938.

The α-tetralones of Formula XIX wherein $R_1$ and/or $R_2$ represents alkenyloxy can be prepared conveniently by alkenylation of the corresponding compounds wherein $R_1$ and/or $R_2$ represents hydroxy. The latter can be obtained conveniently by dealkylation of the corresponding alkoxy compounds using conventional methods, for example, by heating with aluminum chloride or bromide in the presence of an inert solvent such as benzene, xylene, and the like. The alkenylation can be effected using conventional procedures, for example, by reacting the free hydroxy compound with the appropriate alkenyl halide in the presence of a base such as potassium carbonate, sodium methoxide, and the like.

The α-tetralones of Formula XIX wherein $R_1$ and/or $R_2$ represents

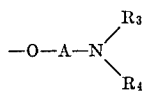

wherein A, $R_3$, and $R_4$ are as hereinbefore defined, can be prepared by etherification of the corresponding free hydroxy compounds with a tertiary-aminoalkyl halide as described above for the preparation of the corresponding compounds in the indanone series.

The acetophenones (XIII) which are employed as starting materials in the above-described synthesis of the α-tetralones (XIX) can be prepared from the corresponding nuclear-substituted benzoic acids by conversion of the latter to the acid chlorides followed by reaction of the latter with dimethyl cadmium according to the procedure described in Chemical Reviews 40, 15, 1947. Many of the acetophenones (XIII) are known in the literature.

The benzaldehydes (XIV) which are employed as starting materials in the above-described synthesis of the α-tetralones (XIX) can be obtained by reduction of the corresponding substituted benzoyl chlorides using lithium tri-t-butoxyaluminum hydride using the procedure described by Brown et al., J. Am. Chem. Soc. 80, 5377, 1958. Many of the benzaldehydes of the Formula XIV are known in the literature.

An alternative method for the preparation of the α-tetralones of Formula XIX is that described by Newman, J. Am. Chem. Soc. 62, 2295, 1940. The method comprises reacting the appropriately substituted benzyl cyanide

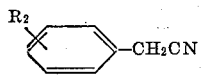

with the appropriately substituted phenethyl bromide

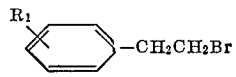

$R_1$ and $R_2$ having the significance hereinbefore defined, in the presence of sodamide and hydrolyzing the resulting nitrile to give the corresponding acid (XVIII) which is then cyclized as hereinbefore described to the α-tetralone (XIX).

Representative of the phenols (I; R=H), prepared by the methods described above, which can be employed as starting materials in the process of the invention are:

2-phenyl-6-methoxy-,
2-phenyl-,
2-p-tolyl-,
2-p-chlorophenyl-,
2-p-methoxyphenyl-,
2-p-fluorophenyl-,
2-(m-trifluoromethylphenyl)-,
2-(p-methylmercaptophenyl)-,
2-(3-allyl-4-methoxyphenyl)-,
2-(p-methoxyphenyl)-6-methoxy-,
2-(p-methoxyphenyl)-5-trifluoromethyl-,
2-(p-methoxyphenyl)-5-(1,3-dimethylbutyl)-,
2-(p-allyloxyphenyl)-,
2-(p-2-diethylaminoethoxyphenyl)-, and
2-(p-2-pyrrolidinoethoxyphenyl)-3-(p-hydroxyphenyl)-indenes and the corresponding 3-(o-hydroxyphenyl) and 3-(m-hydroxyhenyl) isomers thereof; and 2-phenyl-6-methoxy-,
2-phenyl-6-bromo-,
2-phenyl-7-chloro-,
2-phenyl-7-chloro-6-ethyl-,
2-phenyl-8-chloro-6-methyl-,
2-phenyl-7-ethyl-,
2-phenyl-5-fluoro-,
2-phenyl-6-allyl-7-methoxy-,
2-phenyl-7-methylmercapto-,
2-phenyl-6-trifluoromethyl-,
2-(2-bromophenyl)-,
2-(5-bromo-2-methoxyphenyl)-,
2-(3-chlorophenyl)-,
2-(4-hexyloxyphenyl)-,
2-(4-methylmercaptophenyl)-,
2-(4-allyloxyphenyl)-,
2-phenyl-6-(2-diethylaminoethoxy)-, and
2-phenyl-6-(2-pyrrolidinoethoxy)-1-(p-hydroxyphenyl)-3,4-dihydronaphthalene and the 1-(o-hydroxyphenyl) and 1-(m-hydroxyphenyl) isomers thereof.

The acid addition salts of those compounds of the invention having the Formula I which contain a primary or tertiary amino group can be prepared by methods well known in the art. For example, the acid addition salts of the invention can be prepared by reacting the free base with a pharmacologically acceptable acid as hereinbefore defined, in the presence of an inert solvent such as water, ether, and lower alkanols such as methanol, ethanol, and the like.

The quaternary ammonium salts of those compounds of the invention (I) which contain a tertiary amino group can be prepared by reacting the free base of the Formula I with a quaternating agent, for example, an alkyl halide such as methyl iodide, ethyl chloride, isopropyl bromide, and the like, an alkenyl halide such as allyl chloride, allyl bromide, and the like, a dialkyl sulfate such a dimethy sulfate, diethyl sulfate, and the like, an aralkyl halide such as benzhydryl chloride, benzyl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

An alternative method of preparation of the compounds of Formula I in which R represents dihydroxyalkyl-lower-alkyl, wherein the hydroxy groups are on vicinal carbon atoms, consists in reacting the appropriately etherified Grignard reagent

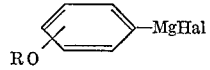

wherein R represents dihydroxyalkyl-lower-alkyl, and Hal is halogen, with the appropriate ketone (VII) under the conditions described above for the preparation of the starting phenols of the invention (I; R=H). Preferably the vicinal hydroxy groups in the radical R above are protected prior to formation of the Grignard reagent, for example, by conversion to the corresponding acetonide or analogue thereof. This can be accomplished by preparing the Grignard reagent from the appropriate halobenzene

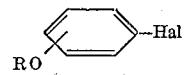

in which R represents lower-alkyl substituted by the group:

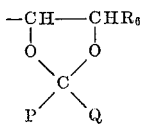

wherein P and Q are selected from the class consisting of hydrogen and lower-alkyl and $R_6$ has the meaning hereinbefore defined. The requisite halobenzene can be prepared by reacting the corresponding (dihydroxyalkoxy)-halobenzene with the appropriate carbonylic compound

under conditions well known in the art for the preparation of acetonides. After the condensation of the ketone and Grignard reagent, the hydroxy groups can be regenerated by removing the protecting group in accordance with conventional procedures for the removal of acetonide groups, for example, by hydrolysis using aqueous or alcoholic mineral acids such as hydrochloric acid, hydrobromic acid or the like.

The following preparations illustrate and exemplify the starting materials to be used in preparing the novel compounds of this invention.

PREPARATION 1

3'-methoxychalcone

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20° C. The mixture was stirred for an additional 30 minutes in the cold and was then stirred for 27 hours at about 25° C. The resulting solution was extracted with ether and the extract was washed with saturated sodium chloride solution before being percolated through anhydrous magnesium sulfate and evaporated to dryness under reduced pressure. There was thus obtained 50.9 g. of 3'-methoxychalcone in the form of an oil having a boiling point of 180 to 185° C. at a pressure of 4 mm. of mercury.

Using the above procedure, but replacing m-methoxyacetophenone by the following known compounds: 4'-amylacetophenone, 3'-bromoacetophenone, 4'-chloroacetophenone, 4'-chloro-3'-ethylacetophenone, 5'-chloro-2'-methoxyacetophenone, 4'-ethylacetophenone, 2'-fluoroacetophenone, 3'-allyl-4'-methoxyacetophenone, 4'-methylmercaptoacetophenone, and 3'-trifluoromethylacetophenone, there are obtained 4'-amylchalcone, 3'-bromochalcone, 4'-chlorochalcone, 4'-chloro-3'-ethylchalcone, 5'-chloro-2'-methoxychalcone, 4'-ethylchalcone, 2'-fluorochalcone, 3'-allyl-4'-methoxychalcone, 4'-methylmercaptochalcone, and 3'-trifluoromethylchalcone, respectively.

Similarly, using the procedure described in Preparation 1, but replacing benzaldehyde by the following known compounds: 2-bromobenzaldehyde, 5-bromo-2-methoxybenzaldehyde, 3-chlorobenzaldehyde, 2-chloro-6-fluorobenzaldehyde, 3,5 - dibromo-2-ethoxybenzaldehyde, 2,3-dichlorobenzaldehyde, p-tolualdehyde, 2,6-dimethylbenzaldehyde, 4-methoxybenzaldehyde, 3,4-diethoxybenzaldehyde, 4-tert.-amyloxybenzaldehyde, 4-hexyloxybenzaldehyde, 4 - methylmercaptobenzaldehyde, 4 - allylbenzaldehyde, and 4-trifluoromethylbenzaldehyde, there are obtained 2-bromochalcone, 5-bromo-2-methoxychalcone, 3-chlorochalcone, 2-chloro-6-fluorochalcone, 3,5-dibromo-2-ethoxychalcone, 2,3-dichlorochalcone, 4-methylchalcone, 2,6-dimethylchalcone, 4-methoxychalcone, 3,4-diethoxychalcone, 4-tert.-amyloxychalcone, 4-hexyloxychalcone, 4-methylmercaptochalcone, 4-allylchalcone, and 4-trifluoromethylchalcone, respectively.

PREPARATION 2

2-phenyl-4-(3-methoxyphenyl)-4-ketobutyronitrile

A solution of 27.8 g. of potassium cyanide in 50 ml. of water was added to a mixture of 50.9 g. of 3'-methoxychalcone, 13.0 g. of acetic acid, and 100 ml. of 95% ethanol over a period of 10 minutes. The temperature was maintained at 45° C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.22 g. of 2-phenyl-4-(3-methoxyphenyl)-4-ketobutyronitrile in the form of a crystalline solid having a melting point of 96 to 101° C. The infrared spectrum of the compound (mineral oil mull) exhibited maxima at 2200, 1660, and 1580 reciprocal centimeters.

Using the above procedure, but replacing 3'-methoxychalcone by 4'-amylchalcone, 3'-bromochalcone, 4'-chlorochalcone, 4'-chloro-3'-ethylchalcone, 5'-chloro-2'-methoxychalcone, 4'-ethylchalcone, 2'-fluorochalcone, 3'-allyl-4'-methoxychalcone, 4'-methylmercaptochalcone, 3'-trifluoromethylchalcone, 2-bromochalcone, 5-bromo-2-methoxychalcone, 3-chlorochalcone, 2-chloro-6-fluorochalcone, 3,5-dibromo-2-ethoxychalcone, 2,3-dichlorochalcone, 4-methylchalcone, 2,6-dimethylchalcone, 4-methoxychalcone, 3,4-diethoxychalcone, 4-tert.-amyloxychalcone, 4-hexyloxychalcone, 4-methylmercaptochalcone, 4-allylchalcone, and 4-trifluoromethylchalcone, there are obtained 2-phenyl-4-(4-amylphenyl)-4-ketobutyronitrile,
2-phenyl-4-(3-bromophenyl)-4-ketobutyronitrile,
2-phenyl-4-(4-chlorophenyl)-4-ketobutyronitrile,
2-phenyl-4-(4-chloro-3-ethylphenyl)-4-ketobutyrontrile,
2-phenyl-4-(5-chloro-2-methoxyphenyl)-
  4-ketobutyronitrile,
2-phenyl-4-(4-ethylphenyl)-4-ketobutyronitrile,
2-phenyl-4-(2-fluorophenyl)-4-ketobutyronitrile,
2-phenyl-4-(3-allyl-4-methoxyphenyl)-4-ketobutyronitrile,
2-phenyl-4-(4-methylmercaptophenyl)-
  4-ketobutyronitrile,
2-phenyl-4-(3-trifluoromethylphenyl)-
  4-ketobutyronitrile,
2-(2-bromophenyl)-4-phenyl-4-ketobutyronitrile,
2-(5-bromo-2-methoxyphenyl)-4-phenyl-
  4-ketobutyronitrile,
2-(3-chlorophenyl)-4-phenyl-4-ketobutyronitrile,
2-(2-chloro-6-fluorophenyl)-4-phenyl-4-ketobutyronitrile,
2-(3,5-dibromo-2-ethoxyphenyl)-4-phenyl-
  4-ketobutyronitrile,
2-(2,3-dichlorophenyl)-4-phenyl-4-ketobutyronitrile,
2-p-tolyl-4-phenyl-4-ketobutyronitrile,
2-(2,6-dimethylphenyl)-4-phenyl-4-ketobutyronitrile,
2-(4-methoxyphenyl)-4-phenyl-4-ketobutyronitrile,
2-(3,4-diethoxyphenyl)-4-phenyl-4-ketobutyronitrile,
2-(4-tert.-amyloxyphenyl)-4-phenyl-4-ketobutyronitrile,
2-(4-hexyloxyphenyl)-4-phenyl-4-ketobutyronitrile,
2-(4-methylmercaptophenyl)-4-phenyl-
  4-ketobutyronitrile,
2-(4-allylphenyl)-4-phenyl-4-ketobutyronitrile, and
2-(4-trifluoromethylphenyl)-4-phenyl-4-ketobutyronitrile, respectively.

PREPARATION 3

2-phenyl-4-(3methoxyphenyl)-4-ketobutyric acid

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice-water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140 to 145° C. An analytical sample having a melting point of 143 to 145° C. was obtained by recrystallization from benzene.

*Analysis.*—Calcd. for $C_{17}H_{16}O_4$ (percent): C, 71.82; H, 5.67. Found (percent): C, 72.10; H, 5.74.

Using the above procedure, but replacing 2-phenyl-4-(3-methoxyphenyl)-4-ketobutyronitrile by the appropriately substituted 2,4-diphenyl-4-ketobutyronitrile (prepared as described in Preparation 2), there are obtained 2-phenyl-4(4-amylphenyl)-4-ketobutyric acid,
2-phenyl-4-(3-bromophenyl)-4-ketobutyric acid,
2-phenyl-4-(4-chlorophenyl)-4-ketobutyric acid,
2-phenyl-4-(4-chloro-3-ethylphenyl)-4-ketobutyric acid,
2-phenyl-4-(5-chloro-2-methoxyphenyl)-4-ketobutyric acid,
2-phenyl-4-(4-ethylphenyl)-4-ketobutyric acid,
2-phenyl-4-(2-fluorophenyl)-4-ketobutyric acid,
2-phenyl-4-(3-allyl-4-methoxyphenyl)-4-ketobutyric acid,
2-phenyl-4-(4-methylmercaptophenyl)-4-ketobutyric acid,
2-phenyl-4-(3-trifluoromethylphenyl)-4-ketobutyric acid,
2-(2-bromophenyl)-4-phenyl-4-ketobutyric acid,
2-(5-bromo-2-methoxyphenyl)-4-phenyl-4-ketobutyric acid,
2-(3-chlorophenyl)-4-phenyl-4-ketobutyric acid,
2-(2-chloro-6-fluorophenyl)-4-phenyl-4-ketobutyric acid,
2-(3,5-dibromo-2-ethoxyphenyl)-4-phenyl-4-ketobutyric acid,
2-(2,3-dichlorophenyl)-4-phenyl-4-ketobutyric acid,
2-p-tolyl-4-phenyl-4-ketobutyric acid,
2-(2,6-dimethyl-phenyl)-4-phenyl-4-ketobutyric acid,
2-(4-methoxyphenyl)-4-phenyl-4-ketobutyric acid,
2-(3,4-diethoxyphenyl)-4-phenyl-4-ketobutyric acid,
2-(4-tert.-amyloxyphenyl)-4-phenyl-4-ketobutyric acid,
2-(4-hexyloxyphenyl)-4-phenyl-4-ketobutyric acid,
2-(4-methyl-mercaptophenyl)-4-phenyl-4-ketobutyric acid,
2-(4-allylphenyl)-4-phenyl-4-ketobutyric acid, and
2-(4-trifluoromethylphenyl)-4-phenyl-4-ketobutyric acid, respectively.

PREPARATION 4

*2-phenyl-4-(3-methoxyphenyl)butyric acid*

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-3-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with ether and the decanted liquid was extracted with ether. The ether extract and washings were combined and washed with water and then with saturated sodium chloride solution before being percolated through anhydrous magnesium sulfate. The percolate was evaporated to dryness. There was thus obtained 26.2 g. of 2-phenyl-4-(3-methoxyphenyl)butyric acid in the form of a viscous oil which was employed without further purification in the process of Preparation 5. The infrared spectrum of the compound (mineral oil mull) exhibited a maximum at 1705 reciprocal centimeters.

Using the above procedure, but replacing the 2-phenyl-4-(3-methoxyphenyl)-4-ketobutyric acid by the appropriately substituted 2,4-diphenyl-4-ketobutyric acid (prepared as described in Preparation 3), there are obtained 2-phenyl-4-(4-amylphenyl)-,
2-phenyl-4-(3-bromophenyl)-,
2-phenyl-4-(4-chlorophenyl)-,
2-phenyl-4-(4-chloro-3-ethylphenyl)-,
2-phenyl-4-(5-chloro-2-methoxyphenyl)-,
2-phenyl-4-(4-ethylphenyl)-,
2-(2,6-dimethylphenyl)-4-phenyl)-,
2-phenyl-4-(3-allyl-4-methoxyphenyl)-,
2-phenyl-4-(4-methylmercaptophenyl)-,
2-phenyl-4-(3-trifluoromethylphenyl)-,
2-(2-bromophenyl)-4-phenyl-,
2-(5-bromo-2-methoxyphenyl)-4-phenyl-,
2-(3-chlorophenyl)-4-phenyl-,
2-(2-chloro-6-fluorophenyl)-4-phenyl-,
2-(3,5-dibromo-2-ethoxyphenyl)-4-phenyl-,
2-(2,3-dichlorophenyl)-4-phenyl-,
2-p-tolyl-4-phenyl-,
2-(2,6-dimethylphenyl)-4-phenyl-,
2-(4-methoxyphenyl)-4-phenyl-,
2-(3,4-diethoxyphenyl)-4-phenyl-,
2-(4-tert.-amyloxyphenyl)-4-phenyl-,
2-(4-hexyloxyphenyl)-4-phenyl-,
2-(4-methylmercaptophenyl)-4-phenyl-,
21(4-allylphenyl)-4-phenyl-, and
2-(4-trifluoromethyl-phenyl)-4-phenylbutyric acids, respectively.

PREPARATION 5

*2-phenyl-6-methoxy-1,2,3,4-tetrahydro-1-naphthalenone*

A total of 150 ml. of liquid hydrogen fluoride was added to 26.2 g. of 2-phenyl-4-(3-methoxyphenyl)butyric acid with cooling and swirling. The resulting mixture was allowed to stand at room temperature for 3 days. The residue was dissolved in methylene chloride and the solution was poured into excess concentrated aqueous potassium carbonate solution. The organic layer was separated, washed with water and saturated sodium chloride solution, and then evaporated to dryness. The residue was dissolved in 2 l. of mixed hexanes (Skellysolve B) containing 7.5% by volume of acetone and the solution was passed through a column of magnesium silicate (Florisil) prewashed with the same solvent mixture. The eluate was evaporated to dryness and the residue (17.0 g.) was recrystallized twice from cyclohexane. There was thus obtained 13.38 g. of 2-phenyl-6-methoxy-1,2,3,4-tetrahydro-1-naphthalenone in the form of a crystalline compound having a melting point of 113 to 116° C.

*Analysis.*—Calcd. for $C_{17}H_{16}O_2$ (percent): C, 80.92; H, 6.39. Found (percent): C, 81.08; H, 6.35.

Using the above procedure, but replacing 2-phenyl-4-(3-methoxyphenyl)butyric acid by the appropriately substituted 2,4-diphenylbutyric acid (prepared as described in Preparation 4), there are obtained 2-phenyl-7-amyl-,
2-phenyl-6-bromo-,
2-phenyl-7-chloro-,
2-phenyl-7-chloro-6-ethyl-,
2-phenyl-8-chloro-5-methoxy-,
2-phenyl-7-ethyl-,
2-phenyl-5-fluoro-,
2-phenyl-6-allyl-7-methoxy-,
2-phenyl-7-methylmercapto,
2-phenyl-6-trifluoromethyl-,
2-(2-bromophenyl)-,
2-(5-bromo-2-methoxyphenyl)-,
2-(3-chlorophenyl)-,
2-(2-chloro-6-fluorophenyl)-,
2-(3,5-dibromo-2-ethoxyphenyl)-,
2-(2,3-dichlorophenyl)-,
2-p-tolyl-,
2-(2,6-dimethylphenyl)-,
2-(4-methoxyphenyl)-, 2-(3,4-diethoxyphenyl)-,
2-(4-tert.-amyloxyphenyl)-,
2-(4-hexyloxyphenyl)-,
2-(4-methylmercaptophenyl)-,
2-(4-allylphenyl)-, and
2-(4-trifluoromethylphenyl) 1,2,3,4-tetrahydro-1-naphthalenones,
respectively,

PREPARATION 6

2-(p-methoxyphenyl)-1-indanone

A solution of 39.0 g. (0.235 mole) of p-methoxyphenylacetic acid in 500 ml. of ether was added to a solution of potassium amide prepared from 20.4 g. (0.52 mole) of potassium in 750 ml. of liquid ammonia. To the resulting mixture was added slowly, with stirring, over a period of 10 minutes, a solution of 33.0 g. (0.26 mole) of benzyl chloride in 60 ml. of ether. The mixture was stirred for a further 30 minutes, at the end of which time an additional 3 ml. (0.003 mole) of benzyl chloride was added and the liquid ammonia was then allowed to evaporate. The residue was dissolved in water and the aqueous solution so obtained was extracted with ether and then filtered through diatomaceous earth (Celite). The filtrate was acidified by the addition of concentrated hydrochloric acid and the solid which separated was isolated by filtration and recrystallized from a mixture of chloroform and hexane. There was thus obtained 53.85 g. of α-benzyl-p-methoxyphenylacetic acid in the form of a crystalline solid having a melting point of 105 to 108° C.

The acid (53.85 g.) so obtained was added portionwise to 300 ml. of well stirred liquid hydrogen fluoride. The hydrogen fluoride was then allowed to evaporate at room temperature and the residue was dissolved in ether. The ethereal solution was washed successively with water, aqueous sodium bicarbonate solution, aqueous 0.5 N sodium hyrdroxide solution, and finally with saturated sodium chloride solution. The washed ethereal solution was dried over anhydrous sodium sulfate, filtered, and the filtrate was evaporated to dryness. The residual oily solid was dissolved in benzene and chromatographed over a column of magnesium silicate (Florisil). The column was eluted with Skellysolve B containing 5% by volume of acetone. The major crystalline fraction was recrystallized from aqueous methanol. There was thus obtained 29.73 g. of 2-(p-methoxyphenyl)-1-indanone in the form of a crystalline solid having a melting point of 74 to 79° C. An analytical sample having a melting point of 79 to 81° C. was obtained by further recrystallization from aqueous methanol.

*Analysis.*—Calcd. for $C_{16}H_{14}O_2$ (percent): C, 80.64; H, 5.92. Found (percent): C, 80.55; H, 5.99.

Using the procedure described in Preparation 6, but replacing p-methoxyphenylacetic acid by p-tolylacetic acid, p-chlorophenylacetic acid, p-fluorophenylacetic acid, m-trifluoromethylphenylacetic acid, p - methylmercaptophenylacetic acid, and 3-allyl-4-methoxyphenylacetic acid, there are obtained 2-(p-tolyl)-1-indanone,
2-(p-chlorophenyl)-1-indanone,
2-(p-fluorophenyl)-1-indanone,
2-(m-trifluoromethylphenyl)-1-indanone,
2-(p-methylmercaptophenyl)-1-indanone, and
2-(3-allyl-4-methoxyphenyl)-1-indanone, respectively.

Similarly, using the procedure described in Preparation 6, but replacing benzyl chloride by m-methoxybenzyl chloride, p-trifluoromethylbenzyl chloride, and p-(1,3-dimethylbutyl)benzyl chloride, there are obtained 2-(p-methoxyphenyl)-5-methoxy-1-indanone,
2-(p-methoxyphenyl)-6-trifluoromethyl-1-indanone, and
2-(p-methoxyphenyl)-6-(1,3-dimethylbutyl)-1-indanone, respectively.

PREPARATION 7

2-phenyl-3-(p-hydroxyphenyl)-6-methoxyindene

A mixture of 12.8 g. of p-bromophenol tetrahydropyranyl ether (Parham et al., J. Am. Chem. Soc. 70, 4187, 1948) and 1.13 g. of magnesium in 130 ml. of tetrahydrofuran was heated at reflux until the metal was all consumed. To the solution so obtained was added a solution of 10 g. of 2-phenyl-5-methoxy-1-indanone in 100 ml. of tetrahydrofuran and the resulting mixture was heated under reflux for 16 hours. At the end of this time the mixture was cooled and 10 ml. of water was added. The re-resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Stark water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25° C.) and then extracted with ether. The organic layer was separated and extracted with 5% aqueous potassium hydroxide solution. The aqueous alkaline extract was acidified by the addition of hydrochloric acid and the solid which separated was isolated by filtration and recrystallized from methanol. There was thus obtained 7.72 g. of 2-phenyl-3-(p-hydroxyphenyl)-6-methoxyindene in the form of a crystalline solid. This material was recrystallized from aqueous methanol to obtain an analytical sample having a melting point of 173 to 175° C.

*Analysis.*—Calcd. for $C_{22}H_{18}O_2$ (percent): C, 84.05; H, 577. Found (percent): C, 83.59; H, 5.94.

PREPARATION 8

1-(p-hydroxyphenyl)-2-phenyl-6-methoxy-3,4-dihydronaphthalene

A solution of 5.83 g. of 2-phenyl-6-methoxy-1,2,3,4-tetrahydro-1-naphthalenone in 75 ml. of tetrahydrofuran was added to a tetrahydrofuran solution containing 0.0247 mole of the Grignard reagent prepared from p-bromophenol tetrahydropyranyl ether using the procedure described in Preparation 7. The resulting mixture was heated under reflux for 16 hours. At the end of this time the mixture was cooled and 10 ml. of water was added. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Stark water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25° C.) and then extracted with ether. The organic layer was separated and extracted with 5% aqueous potassium hydroxide solution. The aqueous alkaline extract was acidified by the addition of hydrochloric acid and the solid which separated was isolated by filtration and dried. The material so obtained was dissolved in methylene chloride and chromatographed on a column of Florisil (magnesium silicate). The column was eluted with Skellysolve B containing increasing proportions of acetone and those fractions which, on the basis of infrared and papergram analysis, were found to contain the desired compound were combined and evaporated to dryness. The residue was recrystallized twice from cyclohexane. There was thus obtained 0.71 g. of 1-(p-hydroxyphenyl)-2-phenyl-6-methoxy-3,4-dihydronaphthalene in the form of a crystalline solid having a melting point of 130 to 131.5° C.

*Analysis.*—Calcd. for $C_{23}H_{20}O_2$ (percent): C, 84.12; H, 6.14. Found (percent): C, 83.64; H, 5.96.

PREPARATION 9

1-(p-hydroxyphenyl)-2-phenyl-7-amyl-3,4-dihydronaphthalene

Using the procedure described in Preparation 8, but replacing 2-phenyl-6-methoxy-1,2,3,4-tetrahydro-1-naphthalenone by 2-phenyl-7 amyl-1,2,3,4-tetrahydro-1 naphthalenone, there is obtained 1-(p-hydroxyphenyl)-2 phenyl 7 amyl-3,4-dihydronaphthalene.

Similarly, using the procedure described in Preparation 8, but replacing 2-phenyl-6-methoxy-1,2,3,4-tetrahydro-1-naphthalenone by:

2-phenyl-6-bromo-,
2-phenyl-7-chloro-,
2-phenyl-7-chloro-6-ethyl-,
2-phenyl-8-chloro-6-methoxy-,
2-phenyl-7-ethyl-,
2-phenyl-5-fluoro-,
2-phenyl-6-allyl-7-methoxy-,
2-phenyl-7-methylmercapto-,
2-phenyl-6-trifluoromethyl-,
2-(2-bromophenyl)-,
2-(5-bromo-2-methoxyphenyl)-,
2-(3-chlorophenyl)-,
2-(2-chloro-6-fluorophenyl)-,
2-(3,5-dibromo-2-ethoxyphenyl)-,
2-(2,3-dichlorophenyl)-,
2-p-tolyl-,
2-(2,6-dimethylphenyl)-,
2-(4-methoxyphenyl)-,
2-(3,4-diethoxyphenyl)-,
2-(4-tert.-amyloxyphenyl)-,
2-(4-hexyloxyphenyl)-,
2-(4-methylmercaptophenyl)-,
2-(4-allylphenyl)-, and
2-(4-trifluoromethylphenyl)-1,2,3,4-tetrahydro-1-naphthalenones, there are obtained:

1-(p-hydroxyphenyl)-2-phenyl-6-bromo-,
1-(p-hydroxyphenyl)-2-phenyl-7-chloro-,
1-(p-hydroxyphenyl)-2-phenyl-7-chloro-6-ethyl-,
1-(p-hydroxyphenyl)-2-phenyl-8-chloro-6-methyl-,
1-(p-hydroxyphenyl)-2-phenyl-7-ethyl-,
1-(p-hydroxyphenyl)-2-phenyl-5-fluoro-,
1-(p-hydroxyphenyl)-2-phenyl-6-allyl-7-methoxy-,
1-(p-hydroxyphenyl)-2-phenyl-7-methylmercapto-,
1-(p-hydroxyphenyl)-2-phenyl-6-trifluoromethyl-,
1-(p-hydroxyphenyl)-2-(2-bromophenyl)-,
1-(p-hydroxyphenyl)-2-(5-bromo-2-methoxyphenyl)-,
1-(p-hydroxyphenyl)-2-(3-chlorophenyl)-,
1-(p-hydroxyphenyl)-2-(2-chloro-6-fluorophenyl)-,
1-(p-hydroxyphenyl)-2-(3,5-dibromo-2-ethoxyphenyl)-,
1-(p-hydroxyphenyl)-2-(2,3-dichlorophenyl)-,
1-(p-hydroxyphenyl)-2-p-tolyl-,
1-(p-hydroxyphenyl)-2-(2,6-dimethylphenyl)-,
1-(p-hydroxyphenyl)-2-(4-methoxyphenyl)-,
1-(p-hydroxyphenyl)-2-(3,4-diethoxyphenyl)-,
1-(p-hydroxyphenyl)-2-(4-tert.-amyloxyphenyl)-,
1-(p-hydroxyphenyl)-2-(4-hexyloxyphenyl)-,
1-(p-hydroxyphenyl)-2-(4-methylmercaptophenyl)-,
1-(p-hydroxyphenyl)-2-(4-allyloxy)-, and
1-(p-hydroxyphenyl)-2-(4-trifluoromethylphenyl)-3,4-dihydronaphthalenes, respectively.

PREPARATION 10

2-phenyl-3-(p-hydroxyphenyl)indene

Using the procedure described in Preparation 7, but replacing 2-phenyl-5-methoxy-1-indanone by 2-phenyl-1-indanone (v. Miller and Rohde, Ber. 25, 2095, 1892), there is obtained 2-phenyl-3-(p-hydroxyphenyl)indene.

Similarly, using the procedure described in Preparation 7, but replacing 2-phenyl-5-methoxy-1-indanone by:

2-(p-tolyl)-1-indanone,
2-(p-chlorophenyl)-1-indanone,
2-(p-methoxyphenyl)-1-indanone,
2-(p-fluorophenyl)-1-indanone,
2-(m-trifluoromethylphenyl)-1-indanone,
2-(p-methylmercaptophenyl)-1-indanone,
2-(3-allyl-4-methoxyphenyl)-1-indanone,
2-(p-methoxyphenyl)-5-methoxy-1-indanone,
2-(p-methoxyphenyl)-6-trifluoromethyl-1-indanone, and
2-(p-methoxyphenyl)-6-(1,3-dimethylbutyl)-1-indanone, there are obtained:

2-(p-tolyl)-,
2-(p-chlorophenyl)-,
2-(p-methoxyphenyl)-,
2-(p-fluorophenyl)-,
2-(m-trifluoromethylphenyl)-,
2-(p-methylmercaptophenyl)-,
2-(3-allyl-4-methoxyphenyl)-,
2-(p-methoxyphenyl)-6-methoxy-,
2-(p-methoxyphenyl)-5-trifluoromethyl-, and
2-(p-methoxyphenyl)-5-(1,3-dimethylbutyl)-3-(p-hydroxyphenyl)indenes, respectively.

PREPARATION 11

2,3-bis(p-hydroxyphenyl)indene (A) *2-(p-hydroxyphenyl)-1-indanone.*—A mixture of 2-(p-methoxyphenyl)-1-indanone and aluminum bromide in benzene is heated according to the procedure described by Sam, J. Am. Chem. Soc. 82, 5205, 1960 to obtain 2-(p-hydroxyphenyl)-1-indanone.

(B) *2-(p - 2 - tetrahydropyranyloxyphenyl) - 1 - indanone.*—A solution of 2-(p-hydroxyphenyl)-1-indanone in ether is treated with an equimolar quantity of 2,3-dihydropyran and one drop of concentrated hydrochloric acid. The mixture so obtained is allowed to stand for several hours, washed with very dilute aqueous sodium hydroxide solution, then with water, and taken to dryness. There is thus obtained 2-(p-2-tetrahydropyranyloxyphenyl)-1-indanone.

(C) *2,3-bis(p-hydroxyphenyl)indene.*—Using the procedure described in Preparation 7, but replacing 2-phenyl-5-methoxy-1-indanone by 2-(p-2-tetrahydropyranyloxyphenyl)-1-indanone, there is obtained 2,3-bis(p-hydroxyphenyl)indene.

PREPARATION 12

2-(p-allyloxyphenyl)-3-(p-hydroxyphenyl)indene (A) *2-(p-allyloxyphenyl)-1-indanone.*—A solution of 2-(p-hydroxyphenyl)-1-indanone (Preparation 11, part A) in methanol containing a slight excess of sodium methoxide is treated slowly with stirring with an excess of allyl chloride. When the addition is complete the mixture is heated under reflux for several hours before being cooled and poured into water. The resulting mixture is extracted with ether and the ethereal extract is washed with aqueous sodium hydroxide solution and with water before being evaporated to dryness to yield 2-(p-allyloxyphenyl)-1-indanone.

(B) 2-(p-allyloxyphenyl) - 3 - (p-hydroxyphenyl)indene.—Using the procedure described in Preparation 7, but replacing 2-phenyl-5-methoxy-1-indanone by 2-(p-allyloxyphenyl)-1-indanone, there is obtained 2-(p-allyloxyhpenyl)-3-(p-hydroxyphenyl)indene.

PREPARATION 13

*2-(p-2-diethylaminoethoxyphenyl)-3-(p-hydroxyphenyl) indene and the hydrochloride thereof*

(A) 2-(p - 2 - diethylaminoethoxyphenyl) - 1 - indanone.—To a suspension of 4.95 g. of 2-(p-hydroxyphenyl)-1-indanone in 100 ml. of ethanol, there is added 4.32 g. of 25% w./w. sodium methoxide in methanol. The resulting mixture is stirred for 1 hr. before being treated with a solution of 6.0 g. of 2-diethylaminoethyl chloride in 200 ml. of ethanol. The mixture so obtained is heated under reflux for 20 hours before being cooled and evaporated to dryness under reduced pressure. The residue is treated with a mixture of water, ether, and methylene chloride. The organic layer is separated, washed with dilute aqueous potassium hydroxide and then wtih saturated sodium chloride solution and dried over anhydrous sodium sulfate. The dried solution is filtered, the filtrate is evaporated to dryness, and the residue is recrystallized from methanol. There is thus obtanied 2-(p-2-diethylaminoethoxyphenyl)-1-indanone.

(B) 2 - (p-2-diethylaminoethoxyphenyl)-3-(p-hydroxyphenyl)indene.—Using the procedure described in Preparation 7, but replacing 2-phenyl-5-methoxy-1-indanone by 2-(p-2-diethylaminoethoxyphenyl)-1-indanone, there is obtained 2-(p-2-diethylaminoethoxyphenyl)-3-(p-hydroxyphenyl)indene.

(C) 2 - (p-2-diethylaminoethoxyphenyl)-3-(p-hydroxyphenylindene hydrochloride.—A solution of 1 g. of 2-(p-2-diethylaminoethoxyphenyl) - 3 - (p-hydroxyphenyl)indene in 25 ml. of anhydrous ether is treated with a slight excess of an ethereal solution of hydrogen chloride. The solid which separates is isolated by filtration, washed with ether, and dried in vacuo. There is thus obtained 2-(p-2-diethylaminoethoxyphenyl)-3-(p - hydroxyphenyl)indene hydrochloride in the form of a crystalline solid.

Similarly, using the procedure set forth in Preparation 13, Parts A, B, and C, but replacing the 2-diethylaminoethyl chloride employed in Part A by:

3-diethylaminopropyl chloride,
2-diethylaminopropyl bromide,
2-dibutylaminoethyl chloride,
2-N-methyl-N-ethylaminoethyl bromide,
3-diethylaminobutyl chloride,
5-dimethylaminopentyl chloride,
2-diethylaminopentyl chloride,
6-dimethylaminohexyl chloride,
2-pyrrolidinoethyl chloride,
3-(2,2-dimethylpyrrolidino)propyl chloride,
2-piperidinoethyl chloride,
2-morpholinoethyl chloride,
2-(1'-methyl-4'-piperazino)ethyl chloride,
2-hexamethyleniminoethyl chloride,
2-homopiperazinoethyl chloride, and
2-homomorpholinoethyl bromide, there are obtained:

2-(p-3-diethylaminopropoxyphenyl)-,
2-(p-2-diethylaminopropoxyphenyl)-,
2-(p-2-dibutylaminoethoxyphenyl)-,
2-(p-2-N-methyl-N-ethylaminoethoxyphenyl)-,
2-(p-3-diethylaminobutoxyphenyl)-,
2-(p-5-dimethylaminopentoxyphenyl)-,
2-(p-2-diethylaminopentoxyphenyl)-,
2-(p-6-dimethylaminohexyloxyphenyl)-,
2-(p-2-pyrrolidinoethoxyphenyl)-,
2-[p-3-(2,2-dimethylpyrrolidino)propoxyphenyl]-,
2-(p-2-piperidinoethoxyphenyl)-,
2-(p-2-morpholinoethoxyphenyl)-,
2-[p-2-(1'-methyl-4'-piperazino)ethoxyphenyl]-,
2-(p-2-hexamethyleniminoethoxyphenyl)-,
2-(p-2-homopiperazinoethoxyphenyl)-, and
2-(p-2-homomorpholinoethoxyphenyl)-3-(p-hydroxyphenyl)indenes, respectively, and the hydrochlorides of each of the above compounds.

PREPARATION 14

*2-phenyl-3-(o-hydroxyphenyl)-6-methoxyindene*

Using the procedure described in Preparation 7, but replacing p-bromophenol tetrahydropyranyl ether by o-bromophenol tetrahydropyranyl ether, there is obtained 2-phenyl-3-(o-hydroxyphenyl)-6-methoxyindene.

Similarly, using the procedure described in Preparation 7, but replacing p-bromophenol tetrahydropyranyl ether by m-bromophenol tetrahydropyranyl ether, there is obtained 2-phenyl-3-(m-hydroxyphenyl)-6-methoxyindene.

PREPARATION 15

*1-(p-hydroxyphenyl)-2-phenyl-6-hydroxy-3,4-dihydronaphthalene*

(A) 2-phenyl-6-hydroxy- 1,2,3,4 -tetrahydro-1-naphthalenone.—Using the procedure described in Preparation 11, Part A, but replacing 2-(p-methoxyphenol)-1-indanone by 2-phenyl-6-methoxy - 1,2,3,4 - tetrahydro - 1 - naphthalenone, there is obtained 2-phenyl-6-hydroxy-1,2,3,4-tetrahydro-1-naphthalenone having a melting point of 180 to 185° C. An analytical sample having a melting point of 183 to 185.5° C. was obtained by recrystallization from chloroform.

*Analysis.*—Calcd. for $C_{16}H_{14}O_2$ (percent): C, 80.64; H, 5.92. Found (percent): C, 80.19; H, 6.17.

(B) 2-phenyl-6-(2-tetrahydropyranyloxy)-1,2,3,4-tetrahydro-1-naphthalenone.—Using the procedure described in Preparation 11, Part B, but replacing 2-(p-hydroxyphenyl)-1-indanone by 2-phenyl-6-hydroxy-1,2,3,4-tetrahydro-1-naphthalenone, there is obtained 2-phenyl-6-(2-tetrahydropyranyloxy) - 1,2,3,4 - tetrahydro - 1 - naphthalenone.

(C) 1-(p-hydroxyphenyl)-2-phenyl-6-hydroxy-3,4-dihydronaphthalene.—Using the procedure described in Preparation 8, but replacing 2-phenyl-6-methoxy-1,2,3,4-tetrahydro-1-naphthalenone by 2-phenyl-6-(2-tetrahydropyranyloxy)-1,2,3,4-tetrahydro-1-naphthalenone, there is obtained 1-(p-hydroxyphenyl)-2-phenyl-6-hydroxy-3,4-dihydronaphthalene.

PREPARATION 16

*1-(p-hydroxyphenyl)-2-phenyl-6-(2-diethylaminoethoxy)-3,4-dihydronaphthalene and the hydrochloride thereof*

(A) 2-phenyl-6-(2-diethylaminoethoxy) - 1,2,3,4-tetrahydro-1-naphthalenone.—A suspension of 11.6 g. of 2-phenyl-6-hydroxy - 1,2,3,4 - tetrahydro - 1 - naphthalenone (Preparation 15, Part A) in 200 ml. of methanol was treated with 10 ml. of 4.8 M sodium methoxide in methanol solution. The mixture was stirred for 15 minutes before adding 13.2 g. of a 1:1 mixture of 2-diethylaminoethyl chloride in toluene. The mixture so obtained was heated under reflux for 17 hours before removing the solvent under reduced pressure. The residue was treated with a mixture of water and methylene chloride and the organic layer was separated, washed with water and then with brine, and evaporated to dryness. The residue was dissolved in 40 ml. of ethanol and treated with 120 ml. of saturated ethanolic picric acid. The solid which separated was isolated by filtration and recrystallized from acetonitrile. There was thus obtained 13.15 g. of 2-phenyl-6-(2-diethylaminoethoxy) - 1,2,3,4 - tetrahydro - 1 - naphthalenone in the form of its picrate having a melting point of 180 to 184° C. An analytical sample having a melting point of 185 to 186° C. was obtained by further recrystallization from the same solvent.

*Analysis.*—Calcd. for $C_{28}H_{30}N_4O_9$ (percent): C, 59.36; H, 5.34; N, 9.89. Found (percent): C, 59.18; H, 5.45; N, 9.99.

(B) 1-(p-hydroxyphenyl)-2-phenyl-6-(2-diethylaminoethoxy)-3,4-dihydronaphthalene and the hydrochloride thereof.—A mixture of 7.46 g. of the picrate prepared as described in Part A above, 50 ml. of methylene chloride and 50 ml. of approx. 14% ammonium hydroxide was shaken at room temperature for 2 hours. The organic layer was separated, washed once with aqueous ammonia, then with water, and with brine, and evaporated to dryness. A solution of the residue in 50 ml. of tetrahydrofuran was added to the Grignard reagent obtained from 7.70 g. of the tetrahydropyranyl ether of p-bromophenol and 0.73 g. of magnesium in 80 ml. of tetrahydrofuran. The resulting mixture was heated under reflux for 17 hours before being cooled and decomposed by the careful addition of water. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was suspended in 150 ml. of 2.5 N hydrochloric acid. The solid which separated was isolated by filtration and recrystallized from a mixture of methanol and 2.5 N hydrochloric acid and then from a mixture of methanol and acetonitrile. There was thus obtained 3.20 g. of 1-(p-hydroxyphenyl)-2-phenyl - 6 - (2-diethylaminoethoxy)-3,4-dihydronaphthalene hydrochloride having a melting point of 232 to 236° C. An analytical sample having a melting point of 233 to 235.5° C. was obtained by further recrystallization from the same solvent mixture.

*Analysis.*—Calcd. for $C_{28}H_{32}ClNO_2$ (percent): C, 74.73; H, 7.17; Cl, 7.88. Found (percent): C, 74.21; H, 7.35; Cl, 7.96.

A suspension of 1 g. of the hydrochloride so obtained in 50 ml. of ether is shaken with aqueous sodium bicarbonate solution and the ether layer is separated and evaporated to dryness. There is thus obtained 1-(p-hydroxyphenyl)-2-phenyl - 6 - (2 - diethylaminoethoxy)-3,4-dihydronaphthalene.

Similarly, using the procedure described in Preparation 16, Parts A and B, but replacing the 2-diethylaminoethyl chloride employed in Part A by:

3-diethylaminopropyl chloride,
2-diethylaminopropyl bromide,
2-dibutylaminoethyl chloride,
2-N-methyl-N-ethylaminoethyl bromide,
3-diethylaminobutyl chloride,
5-dimethylaminopentyl chloride,
2-diethylaminopentyl chloride,
6-dimethylaminohexyl chloride,
2-pyrrolidinoethyl chloride,
3-(2,2-dimethylpyrrolidino)propyl chloride,
2-piperidinoethyl chloride,
2-morpholinoethyl chloride,
2-(1'-methyl-4'-piperazino)ethyl chloride,
2-hexamethyleniminoethyl chloride,
2-homopiperazinoethyl chloride, and
2-homomorpholinoethyl bromide, there are obtained:

1-(p-hydroxyphenyl)-2-phenyl-6-(3-diethylaminopropoxy)-,
1-(p-hydroxyphenyl)-2-phenyl-6-(2-diethylaminopropoxy)-,
1-(p-hydroxyphenyl)-2-phenyl-6-(2-dibutylaminoethoxy)-
1-(p-hydroxyphenyl)-2-phenyl-6-(2-N-methyl-N-ethylamino-ethoxy)-,
1-(p-hydroxyphenyl)-2-phenyl-6-(3-diethylaminobutoxy)-,
1-(p-hydroxyphenyl)-2-phenyl-6-p-(5-dimethylaminopentoxy)-,
1-(p-hydroxyphenyl)-2-phenyl-6-(2-diethylaminopentoxy)-,
1-(p-hydroxyphenyl)-2-phenyl-6-(6-dimethylaminohexyloxy)-,
1-(p-hydroxyphenyl)-2-phenyl-6-(2-pyrrolidinoethoxy)-,
1-(p-hydroxyphenyl)-2-phenyl-6-[3-(2,2-dimethylpyrrolidino)propoxy]-,
1-(p-hydroxyphenyl)-2-phenyl-6-(2-piperidinoethoxy)-,
1-(p-hydroxyphenyl)-2-phenyl-6-(2-morpholinoethoxy)-,
1-(p-hydroxyphenyl)-2-phenyl-6-[2-(1'-methyl-4'-piperazino) ethoxy]-,
1-(p-hydroxyphenyl)-2-phenyl-6-(2-hexamethyleniminoethoxy)-,
1-(p-hydroxyphenyl)-2-phenyl-6-(2-homopiperazinoethoxy)-, and
1-(p-hydroxyphenyl)-2-phenyl-6-(2-homomorpholinoethoxy)-3,4-dihydronaphthalenes, respectively, and the hydrochlorides of the above-named compounds.

PREPARATION 17

*1-(m-hydroxyphenyl)-2-phenyl-6-methoxy-3,4-dihydro-naphthalene*

Using the procedure described in Preparation 8, but replacing the Grignard reagent prepared from p-bromophenol tetrahydropyranyl ether by the Grignard reagent prepared from m-bromophenol tetrahydropyranyl ether, there is obtained 1-(m-hydroxyphenyl)-2-phenyl-6-methoxy-3,4-dihydronaphthalene.

Similarly, using the procedure of Preparation 28, put using the Grignard reagent prepared from o-bromophenol tetrahydropyranyl ether, there is obtained 1-(o-hydroxy- The following examples illustrate the best method contemplated by the inventor for carrying out his invention.

EXAMPLE 1

*Ethyl 2[p-(3,4-dihydro-6-methoxy-2-phenyl-1-naphthyl)phenoxy]-2-methylpropionate*

Sodium hydride (0.35 g. of a 53% suspension in mineral oil) was added to 2.50 g. of 1-(p-hydroxyphenyl)-2-phenyl-6-methoxy-3,4-dihydronaphthalene in 13 ml. of dimethylformamide and 65 ml. of benzene. When effervescence had ceased, 1.50 g. of ethyl 2-bromo-2-methylpropionate in 15 ml. of benzene was added and the mixture was heated under reflux for 17 hours. The mixture was allowed to cool, washed with water and brine, and taken to dryness. The residual gum was chromatographed over Florisil (magnesium silicate). The column was eluted with ligroin containing 5% by volume of acetone and those fractions which, on the basis of infrared and papergram analysis, where found to contain the desired product were combined and evaporated to dryness. There was thus obtained 1.94 g. of crude ethyl 2-[p-(3,4-dihydro - 6-methoxy-2-phenyl-1-naphthyl)phenoxy]-2-methylpropionate and 0.71 g. of recovered phenol. The former was recrystallized from ligroin to give 1.82 g. of ethyl 2 [p-(3,4-dihydro-6-methoxy-2-phenyl-1 - naphthyl)phenoxy]-2-methylpropionate having a melting point of 107 to 111° C.

*Analysis.*—Calcd. for $C_{29}H_{30}O_4$ (percent): C, 78.70; H, 6.83. Found (percent): C, 78.66; H, 7.06.

Using the above procedure but replacing ethyl 2-bromo-2-methylpropionate by ethyl bromoacetate, ethyl 5-bromovalerate, methyl 9-bromocaprate, and ethyl 2-chlorolaurate, there are obtained ethyl [p-(3,4-dihydro-6-methoxy-2-phenyl-
1-naphthyl) phenoxy]acetate,
ethyl 5-[p-(3,4-dihydro-6-methoxy-2-phenyl-
1-naphthyl)phenoxy]valerate,
methyl 9-[p-(3,4-dihydro-6-methoxy-2-phenyl-
1-naphthyl)phenoxy]caprate, and
ethyl 2-[p-(3,4-dihydro-6-methoxy-2-phenyl-
1-naphthyl)phenoxy]laurate,
respectively.

Similarly, using the procedure described in Example 1 above and reacting the appropirate halo carboxylic ester with the appropriate phenol there are obtained other carbalkoxyalkyl ethers of the invention. Typical of the ethers so prepared are:

ethyl 2[p-2-phenyl-6-methoxy-3-indenyl)-
phenoxy]-2-methylpropionate,
ethyl[p-(2-p-fluorophenyl-3-indenyl)phenoxy[acetate,
ethyl 2-[p-(2-p-methoxyphenyl-6-methoxy-
3-indenyl)phenoxy]-2-methylpropionate,
ethyl 2-[p-2-p-alloxyphenyl-3-indenvyl)phenoxy]-
2-methylpropionate,
ethyl 5-{p-[3,4-dihydro-6-(2-diethylaminoethoxy)-
2-phenyl-1-naphthyl]phenoxy}valerate, and
ethyl 2-[m-(3,4-dihydro-6-methoxy-2-phenyl-
1-naphthyl)phenoxy]-2-methylpropionate.

EXAMPLE 2

2-[p-(3,4-dihydro-6-methoxy-2-phenyl-1-naphthyl)-
phenoxy]-2-methylpropionic acid A solution of 1.42 g. of ethyl 2-[p-(3,4-dihydro-6-methoxy-2-phenyl-1-naphthyl)phenoxy] - 2 - methylpropionate and 3 ml. of 50% aqueous potassium hydroxide solution in 50 ml. of methanol was heated under reflux for 5 hours. The solvent was then removed in vacuo, the residual solid was suspended in water, and this mixture was made strongly acidic with 2.5 N hydrochloric acid. The precipitate was collected on a filter and recrystallized twice from aqueous methanol. There was obtained 1.04 g. of 2-[p-(3,4-dihydro-6-methoxy-2-phenyl-1-naphthyl)-phenoxy]-2-methylpropionic acid having a melting point of 136 to 137° C.

*Analysis.*—Calcd. for $C_{27}H_{26}O_4$ (percent): C, 78.24; H, 6.32. Found (percent): C, 78.13; H, 6.62.

Similarly, using the above procedure, other carbalkoxyalkyl ethers of the invention are converted to the corresponding carboxyalkyl ethers. Representative of the latter compounds so prepared are:

[p-(3,4-dihydro-6-methoxy-2-phenyl-
1-naphthyl)phenoxy]acetic acid,
5-[p-(3,4-dihydro-6-methoxy-2-phenyl-
1-naphthyl)phenoxy]valeric acid,
9-[p-(3,4-dihydro-6-methoxy-2-phenyl-
1-naphthyl)phenoxy]capric acid,
2-[p-(3,4-dihydro-6-methoxy-2-phenyl-
1-naphthyl)phenoxy]lauric acid,
2-[p-(2-phenyl-6-methoxy-3-indenyl)phenoxy]-
2-methylpropionic acid,
[p-(2-p-fluorophenyl-3-indenyl)phenoxy]acetic acid,
2-[p-(2-p-methoxyphenyl-6-methoxy-
3-indenyl)phenoxy]-2-methylpropionic acid,
2-[p-(3,4-dihydro-2-p-alloxyphenyl-
3-indenyl)phenoxy]-2-methylpropionic acid,
5{p-[3,4-dihydro-6-(2-diethylaminoethoxy)
2-phenyl-1-naphthyl]phenoxy}valeric acid, and
2-[m-(3,4-dihydro-6-methoxy-2-phenyl-
1-naphthyl)phenoxy]-2-methylpropionic acid.

The carboxyalkyl ethers of the invention, illustratively those described above, are converted to their alkali metal salts such as the sodium, potassium, and lithium salts and their alkaline earth metal salts such as the calcium, barium, and strontium salts by neutralization of the acid with the appropriate base in aqueous or aqueous alcoholic media.

EXAMPLE 3

1-[p-(2,3-dihydroxypropoxy)phenyl]-2-phenyl-
6-methoxy-3,4-dihydronaphthalene

To a suspension of 2.97 g. of 1-(p-hydroxyphenyl)-2-phenyl-6-methoxy-3,4-dihydronaphthalene in 50 ml. of methanol there was added 2.1 ml. of 4.55 N sodium methoxide in methanol. When the solid had completely dissolved, 1.0 g. of 1-chloro-2,3-propane-diol was added. The mixture was heated for 20 hours under reflux and the solvent was removed in vacuo. The residue was dissolved in ether and water. The organic layer was washed with 5% aqueous sodium hydroxide solution, water and brine and taken to dryness. The residue was chromatographed on a column of magnesium silicate (Florisil) and the column was eluted with petroleum ether containing increasing proportions of acetone. Those fractions which, on the basis of infrared and papergram analysis were found to contain the desired product, were combined and evaporated to dryness. The solid so obtained was recrystallized twice from aqueous methanol to give 1.33 g. of 1-[p-(2,3 - dihydroxypropoxy) phenyl] - 2-phenyl-6-methoxy-3,4-dihydronaphthalene having a melting point of 106 to 108° C.

*Analysis.*—Calcd. for $C_{26}T_{26}O_4$ (percent): C, 77.59; H, 6.51. Found (percent): C. 77.13; H, 6.49.

Similarly, using the above procedure but replacing 1-chloro - 2,3 - propanediol by 1-chloro - 2,3 - butanediol, 1-bromo-3,5-pentanediol, 2-bromomethyl-2-ethyl-1,3-propanediol, 1-chloro-2,6-heptanediol, and 6-chloro-1,5-hexanediol, there are obtained 1-[p-(2,3-dihydroxybutoxy)phenyl]-,
1-[p-(3,5-dihydroxypentyloxy)phenyl]-,
1-[p-(2,2-bis(hydroxymethyl)butoxy)phenyl]-,
1-[p-(2,6-dihydroxyheptyloxy)phenyl]-, and
1-[p-(2,6-dihydroxyhexyloxy)phenyl]-2-phenyl-
6-methoxy-3,4-dihydronaphthalene, respectively.

Similarly, using the above procedure and reacting the appropriate dihydroxyalkyl halide with the appropriate phenol there are obtained other dihydroxyalkyl ethers of the invention. Representative of the ethers so prepared are the 2,3-dihydroxypropyl, 2,3-dihydroxybutyl, 3,5-dihydroxypentyl, 2,2-bis(hydroxymethyl)butyl, 2,6-dihydroxyheptyl, and 2,6-dihydroxyhexyl ethers of 2-(p-methylmarcaptophenyl)-,
2-(p-methoxyphenyl)-6-methoxy-,
2-(p-allyloxyphenyl)-,
2-(p-2-diethylaminoethoxyphenyl)-, and
2-[p-(2-pyrrolidinoethoxy)phenyl]-3-(p-hydroxyphenyl)
idene; and
2-phenyl-6-bromo-,
2-phenyl-7-chloro-,
2-phenyl-6-allyl-7-methoxy-,
2-phenyl-7-methylmarcapto-,
2-(3-chlorophenyl)-,
2-(4-hexyloxyphenyl)-,
2-(4-methylmarcaptophenyl),
2-phenyl-6-(2-diethylaminoethoxy)-, and
2-phenyl-6-(2-pyrrolidinoethoxy)-1-(p-hydroxyphenyl)-
3,4-dihydronaphthalene and the 1-(o-hydroxyphenyl)
and 1-(m-hydroxyphenyl)isomers thereof.

EXAMPLE 4

1-[p-(2,3-dihydroxypropoxy)phenyl]-2-phenyl-6-
methoxy-3,4-dihydronaphthalene cyclic carbonate Ethyl chloroformate (3 ml.) was added dropwise to an ice-cooled solution of 2.81 g. of 1-[p-(2,3-dihydroxypropoxy)phenyl]-2-phenyl - 6 - methoxy-3,4-dihydronaphthalene in 28 ml. of pyridine. At the end of 1 hour, the mixture was diluted with water and the precipitated oil was dissolved in ether. The organic layer was washed with ice cold 2.5 N hydrochloric acid and water and taken to dryness. The residual gum was dissolved in pyridine (28 ml.), treated with ethyl chloroformate, and the reaction product was worked up as above.

The gummy product so obtained was dissolved in 300 ml. of benzene and the solution was heated under reflux with 300 mg. of sodium hydride for 2 hours. The mixture was allowed to cool, 25 ml. of saturated aqueous ammonium chloride was added, and the organic layer was separated. The gum which remained when the solvent was removed was chromatographed on a column of magnesium silicate (Florisil) and the column was eluted with petroleum ether containing increasing proportions of acetone. Those fractions which, on the basis in infrared and papergram analysis were found to contain the desired product, were combined and evaporated to dryness. There was thus obtained 0.21 g. of crude carbonate and 1.07 g. of recovered diol. The former was recrystalized several times from methanol to afford 0.16 g. of 1-[p-(2,3-dihydroxypropoxy)phenyl]-2-phenyl - 6 - methoxy-3,4-dihydronaphthalene cyclic carbonate having a melting point of 158 to 160° C.

Analysis.—Calcd. for $C_{27}H_{24}O_5$ (percent): C, 75.68; H, 5.65. Found (percent): C, 75.72; H, 5.66.

Similarly, using the above procedure other dihydroxyalkyl ethers of the invention wherein the two hydroxy groups of the dihydroxyalkyl radical are attached to adjacent carbon atoms are converted to the corresponding cyclic carbonates. Representative of the compounds so prepared are the cyclic carbonates of the 2,3-dihydroxypropyl and 2,3-dihydroxybutyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and
2-[p-(2-pyrrolidinoethoxy)phenyl]-3-(p-hydroxyphenyl) indene; and
2-phenyl-6-bromo-,
2-phenyl-7-chloro-,
2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)- 3,4-dihydronaphthalene
and the 1-(o-hydroxyphenyl) and 1-(m-hydroxyphenyl) isomers thereof.

EXAMPLE 5

*1-[p-(2,3-epoxypropoxy)phenyl]-2-phenyl-6-methoxy-3,4-dihydronaphthalene*

Using the procedure described in Example 1, but replacing ethyl 2-bromo-2-methylpropionate by epichlorohydrin, there was obtained 1-[p-(2,3-epoxypropoxy) phenyl]-2-phenyl - 6 - methoxy-3,4-dihydronaphthalene in the form of a crystalline solid having a melting point of 114 to 117 C.

Analysis.—Calcd. for $C_{26}H_{24}O_3$ (percent): C, 81.22; H, 6.29. Found (percent): C, 81.35; H, 6.55.

Similarly, using the procedure of Example 1, but replacing ethyl 2-bromo-2-methylpropionate by 3-bromo-1,2-epoxybutane and 5-bromo-1,2-epoxypentane there are obtained 1-[p-(2,3-epoxy-1-methylpropoxy)phenyl]- and 1-[p(4,5-epoxypentyloxy)phenyl]-2-phenyl - 6 - methoxy-3,4-dihydronaphthalene.

Similarly, using the procedure of Example 1 and reacting the appropriate epoxyalkyl halide with the appropriate phenol there are obtained other epoxyalkyl ethers of the invention. Representative of such compounds are the 2,3-epoxypropyl, 2,3-epoxy-1-methylpropyl and 4,5-epoxypentyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and
2-[p-(2-pyrrolidinoethoxy)phenyl]-3-(p-hydroxyphenyl) indene; and
2-phenyl-6-bromo-,
2-phenyl-7-chloro-,
2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)- 3,4-dihydronaphthalene
and the 1-(o-hydroxyphenyl) and 1-(m-hydroxyphenyl) and the 1-(o-hydroxyphenyl) and 1-(m-hydroxyphenyl) isomers thereof.

EXAMPLE 6

*1-[p-(3-amino-2-hydroxypropoxy)phenyl] - 2 - phenyl - 6-methoxy-3,4-dihydronaphthalene and the hydrochloride thereof*

A mixture of 3.0 g. of 1-[p-(2,3-epoxypropoxy)phenyl]-2-phenyl-6-methoxy-3,4-dihydronaphthalene, 0.80 g. of succinimide, and 4 drops of piperidine in 100 ml. of absolute ethanol was heated under reflux for 17 hours. The volume was reduced to 30 ml. in vacuo and the mixture was diluted with water. The gel-like precipitate was taken up in methylene chloride. The methylene chloride solution was washed with water and brine and taken to dryness. The residue was recrystallized twice from aqueous methanol to give 2.63 g. of 1-[3-succinimido-2-hydroxypropoxy)phenyl] - 2-phenyl - 6-methoxy - 3,4-dihydronaphthalene having a melting point of 142 to 148° C.

Analysis.—Calcd. for $C_{30}H_{29}NO_5$ (percent): C, 74.51; H, 6.05. Found (percent): C, 74.23; H, 6.06.

A mixture of 4.19 g. of the succinimido compound prepared in the above manner and 16 g. of sodium hydroxide in 320 ml. of 95% ethanol was heated under reflux for 20 hours. The bulk of the solvent was then removed under reduced pressure. The residue was taken up in a small amount of methylene chloride and water. The organic layer was separated, washed with water, and transferred to an Erlenmeyer flask. The solution was shaken with 100 ml. of 2.5 N hydrochloric acid to afford a solid precipitate. This was recrystallized from a mixture of methanol and 2.5 N hydrochloric acid to yield 3.10 g. of 1-[p-(3-amino-2-hydroxypropoxy)phenyl] - 2 - phenyl-6-methoxy-3,4-dihydronaphthalene hydrochloride having a melting point of 178 to 184° C.

An analytical sample, obtained from another run, melted at 176 to 184° C.

Analysis.—Calcd. for $C_{26}H_{28}ClNO_3$ (percent): C, 71.30; H, 6.44; Cl, 8.10. Found (percent): C, 71.33; H, 6.89; Cl, 7.90.

A suspension of 310 g. of the above hydrochloride in a mixture of 50 ml. each of methylene chloride and saturated aqueous sodium bicarbonate solution was shaken until all the solid had disappeared. The organic layer was separated, washed with water and brine, and evaporated to dryness to yield 1-[p-(3-amino-2-hydroxypropoxy) phenyl]-2-phenyl-6-methoxy-3,4-dihydronaphthalene.

Using the above procedure of Example 6, other epoxyalkyl ethers of the invention are converted to the corresponding (2-amino-1-hydroxyethyl)alkyl ethers of the invention. Illustratively, using the procedure of Example 6 the 2,3-epoxypropyl, 2,3-epoxy-1-methylpropyl and 4,5-epoxypentyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and 2-[p-(2-pyrrolidinoethoxy)phenyl]-3-(p-hydroxyphenyl) indene; and 2-phenyl-6-bromo-,
2-phenyl-7-chloro-,
2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)- 3,4-dihydronaphthalene and the 1-(o-hydroxyphenyl) and 1-(m-hydroxyphenyl) isomers thereof are converted to the corresponding 3-amino-2-hydroxypropyl, 3-amino-2-hydroxy-1-methylpropyl and 5-amino-4-hydroxypentyl ethers.

EXAMPLE 7

5-[p-(3,4-dihydro-6-methoxy-2-phenyl-1-naphthyl) phenoxy]methyl-2-oxazolidinethione To a mixture of 2.88 g. of 1-[p-(3-amino-2-hydroxypropoxy)phenyl] - 2-phenyl-6-methoxy-3,4-dihydronaphthalene and 0.85 ml. of carbon disulfide in 100 ml. of ethanol there was added 3.1 ml. of 25% aqueous potassium hydroxide solution. The mixture was heated at reflux for 4 hours. Within one hour solid separated. The volume was reduced in volume under reduced pressure. The residue was suspended in water and the mixture was made acidic with 2.5 N hydrochloric acid. The extremely fine precipitate was extracted with 600 ml. of hot methylene chloride. The residue which remained when the methylene chloride solution was taken to dryness was recrystallized once from aqueous dimethylformamide and then from aqueous tetrahydrofuran to yield 2.15 g. 5-[p-(3,4 - dihydro - 6-methoxy - 2 - phenyl - 1 - naphthyl) phenoxy]methyl-2-oxazolidinethione having a melting point of 245 to 246° C.

Analysis.—Calcd. for $C_{27}H_{25}NO_3$ (percent): C, 73.11; H, 5.68; S, 7.23. Found (percent): C, 73.46; H, 5.96; S, 6.99.

Similarly, using the above procedure other (2-amino-1-hydroxyethyl)alkyl ethers of the invention are converted to the corresponding [5-(2-thiooxazolidinyl)] alkyl ethers. Illustratively, the 3-amino-2-hydroxypropyl, 3-amino-2-hydroxy-1-methylpropyl, and 5-amino-4-hydroxypentyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and
2-[p-(2-pyrollidinoethoxy)phenyl]-3-(p-hydroxyphenyl) indene; and 2-phenyl-6-bromo-,
2-phenyl-7-chloro-,
2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)- 3,4-dihydronaphthalene and the 1-(o-hydroxyphenyl) and 1-(m-hydroxyphenyl) isomers thereof are converted to the corresponding [5-(2-thioxooxazolidinyl)]methyl, 1-[5-(2-thioxooxazolidinyl] ethyl, and 3-[5-(2-thioxooxazolidinyl)]propyl ethers.

EXAMPLE 8

5-[p-(3,4-dihydro-6-methoxy-2-phenyl-1-naphthyl) phenoxy]methyl-2-oxazolidinone

To a vigorosuly stirred suspension of 3.7 g. of 1-[p-(3-amino-2-hydroxypropoxy)phenyl] - 2 - phenyl - 6-methoxy-3,4-dihydronaphthalene in 30 ml. of toluene and 30 ml. of 12.5% aqueous potassium hydroxide solution is added dropwise over a short period 3.2 g. of phosgene in 10 ml. of toluene. The toluene layer is separated, washed with water, and evaporated to dryness. The residue is chromatographed on a column of Florisil and the column is eluted with petroleum ether containing increasing proportions of acetone. Those fractions of eluate which, on the basis of infrared and chromatographic analysis, are found to contain the desired product are combined and evaporated to dryness. There is thus obtained 5-[p-(3,4-dihydro-6-methoxy-2-phenyl-1-naphthyl) phenoxy]methyl-2-oxazolidinone in the form of a crystalline solid.

Similarly, using the above procedure other (2-amino-1-hydroxyethyl)alkyl ethers of the invention are converted to the corresponding [5-(2-oxoöxazolidinyl)]alkyl ethers. Illustratively, the 3-amino-2-hydroxypropyl, 3-amino-2-hydroxy-1-methylpropyl, and 5-amino - 4 - hydroxypentyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and
2-[p-(2-pyrrolidinoethoxy)phenyl]-3-(p-hydroxyphenyl) indene; and 2-phenyl-6-bromo-,
2-phenyl-7-chloro-,
2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)- 3,4-dihydronaphthalene and the 1-(o-hydroxyphenyl) and 1-(m-hydroxyphenyl) isomers thereof are converted to the corresponding [5-(2-oxooxazolidinyl)]methyl, 1-[5-(2-oxooxazolidinyl)]ethyl, and 3-[5-(2-oxooxazolidinyl)]propyl ethers.

EXAMPLE 9

1-[p-(2,3-dihydroxypropoxy)phenyl]-2-phenyl - 6 - methoxy-3,4-dihydronaphthalene cyclic thionocarbonate A mixture of 2.81 g. of 1-[p-(2,3-dihydroxypropoxy) phenyl]-2-phenyl-6-methoxy-3,4-dihydronaphthalene and 1.25 g. of thiocarbonyldiimidazole in 100 ml. of toluene is heated under reflux for 1 hour. The reaction mixture is evaporated to dryness and the residue is chromatographed on a column of Florisil (magnesium silicate). The column is eluted with acetone and those fractions increasing proportions of acetone and those fractions which, on the basis of infrared and paper chromatographic analyses, are found to contain the desired material, are combined and evaporated to dryness. The residue is recrystallized from aqueous ethanol to give 1-[p-(2,3-dihydroxypropoxy)phenly]-2-phenyl - 6 - methoxy-3,4-dihydronaphthalene cyclic thionocarbonate.

Similarly, using the above procedure, other dihydroxyalkyl ethers of the invention, for example those described in Example 3 above, wherein the two hydroxy groups of the dihydroxyalkyl radical are attached to adjacent carbon atoms, are converted to the corresponding cyclic thionocarbonates. Representative of the compounds so prepared are the cyclic thionocarbonates of the 2,3-dihydroxypropyl and 2,3-dihydroxybutyl ethers of 2-(p-methylmercaptophenyl)-,
2-(p-methoxyphenyl)-6-methoxy-,
2-(p-allyloxyphenyl)-,
2-(p-2-diethylaminoethoxyphenyl)-, and
2-[p-(2-pyrrolidinoethoxy)phenyl]-3-(p-hydroxyphenyl) indene; and 2-phenyl-6-bromo-,
2-phenyl-7-chloro-, 2-phenyl-6-allyl-7-methoxy-,
2-phenyl-7-methylmercapto-,
2-(3-chlorophenyl)-,
2-(4-hexyloxyphenyl)-,
2-(4-methylmercaptophenyl)-,
2-phenyl-6-(2-diethylaminoethoxy)-, and
2-phenyl-6-(2-pyrrolidinoethoxy)-1-(p-hydroxyphenyl)-3,4-dihydronaphthalene and the 1-(o-hydroxyphenyl) and 1-(m-hydroxyphenyl) isomers thereof.

EXAMPLE 10

*1-[p-(3-amino-2-hydroxypropoxy)phenyl]-2-phenyl-6-methoxy-3,4-dihydronaphthalene hydrobromide*

To a solution of 1 g. of 1-[p-(3-amino-2-hydroxypropoxy)phenyl]-2-phenyl-6-methoxy - 3,4 - dihydronaphthalene in 100 ml. of ether is added dropwise, with stirring, a slight excess of a 0.1 N ethereal solution of hydrogen bromide. The solid which separates is isolated by filtration, washed with ether, and dried. There is thus obtained 1-[p-(3-amino-2-hydroxypropoxy)phenyl] - 2 - phenyl-6-methoxy-3,4-dihydronaphthalene hydrobromide.

In like manner, employing any of the amino compounds of the invention, for example those disclosed in Examples 3 through 9, and the appropriate acid, there are obtained the corresponding acid addition salts. Illustratively, using procedures analogous to those described above, the amines disclosed in Examples 3 through 9 are converted to their acid addition salts with sulfuric, nitric, phosphoric, lactic, benzoic, methanesulfonic, p-toluenesulfonic, salicylic, acetic, propionic, malic, tartaric, citric, cyclohexanesulfamic, succinic, nicotinic, and ascorbic acids.

EXAMPLE 11

*1-[p-(2,3-dihydroxypropoxy)phenyl]-2-phenyl-6-(2 - diethylaminoethoxy)-3,4-dihydronaphthalene methiodide*

A solution of 1 g. of 1-[p-2,3-dihydroxypropoxy)phenyl]-2-phenyl-6-(2 - diethylaminoethoxy)-3,4-dihydronaphthalene (prepared as described in Example 3) in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 1-[p-(2,3-dihydroxypropoxy)phenyl]-2-phenyl - 6 - (2 - diethylaminoethoxy)-3,4-dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-[p-(2,3-dihydroxypropoxy) phenyl]-2-phenyl-6-(2 - diethylaminoethoxy)-3,4-dihydronaphthalene.

Similarly, using the procedure described in Example 11, but replacing 1-[p-(2,3-dihydroxypropoxy)phenyl]-2-phenyl-6-(2-diethylaminoethoxy - 3,4 - dihydronaphthalene by any of the tertiary bases prepared as described in Examples 3 through 9, there are obtained the corresponding methiodides and like quaternary ammonium salts.

EXAMPLE 12

*1-[p-(2,3-dihydroxypropoxy)phenyl]-2-phenyl - 6 - (2-diethylaminoethoxy) - 3,4 - dihydronaphthalene methochloride*

A solution of 1 g. of 1-[p-(2,3-dihydroxypropoxy) phenyl]-2-phenyl-6-(2 - diethylaminoethoxy) - 3,4 - dihydronaphthalene methiodide in dimethylformamide is shaken with a suspension of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 1-[p-(2,3-dihydroxypropoxy)phenyl]-2-phenyl - 6 - (2 - diethylaminoethoxy)-3,4-dihydronaphthalene methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary ammonium salts of the invention can be exchanged by any other desired anion by forming the corresponding quaternary ammonium hydroxide and reacting the latter with the appropriate acid.

EXAMPLE 13

*1-[p-(2,3-dihydroxypropoxy)phenyl]-2-phenyl-6-methoxy-3,4-dihydronaphthalene*

A mixture of 13.7 g. of 1-(2,3-dihydroxypropoxy)-4-bromobenzene, 125 ml. of acetone, and 7.8 g. of copper sulfate (previously dried in vacuo at 100° C.) was stirred in suspension for 18.5 hours. The resulting mixture was filtered and evaporated to dryness. The residual oil was distilled under reduced pressure and the fraction having a boiling point of 121 to 127° C. at 0.45 mm. of mercury was collected. There was thus obtained 1-[2,3-(isopropylidenedioxy)propoxy]-4-bromobenzene in the form of an oil.

*Analysis.*—Calcd. for $C_{12}H_{15}BrO_3$ (percent): C, 50.19; H, 5.27; Br, 27.83. Found (percent): C, 50.26; H, 5.37; Br, 27.70.

A Grignard reagent was prepared from 0.57 g. of magnesium and 6.7 g. of 1-[2,3-(isopropylidenedioxy)propoxy]-4-bromobenzene in 67 ml. of tetrahydrofuran and to the cooled solution was added, with stirring and cooling under an atmosphere of nitrogen, a total of 1.15 g. of 2-phenyl-6-methoxy - 1,2,3,4 - tetrahydro-1-naphthalenone over a period of approximately 15 minutes. The mixture was then allowed to stand at about 25° C. overnight before being decomposed by the addition of ammonium chloride followed by water. The organic layer was separated and washed successively with saturated aqueous ammonium chloride solution, water, and saturated sodium chloride solution. The aqueous extracts were each extracted with ether and the combined ether extracts and original organic layer were evaporated to dryness. The residue, 1-{p-[2,3-(isopropylidenedioxy) propoxy]phenyl}-2-phenyl-6-methoxy - 3,4 - dihydronaphthalene, was stirred at about 25° C. for 2 hours with a mixture of 50 ml. of methanol containing 10 ml. of 2.5 N hydrochloric acid. At the end of this period the mixture was made slightly basic by the addition of aqueous sodium bicarbonate solution and the mixture was diluted with water and extracted with three portions of methylene chloride. The methylene chloride extracts were washed with water and then with saturated aqueous ammonium chloride solution, and the aqueous washes were themselves extracted with ether. The combined methylene chloride extracts and ether washings were evaporated to dryness and the residual gum was chromatographed on a column of magnesium silicate (Florisil). The column was eluted with hexanes (Skellysolve B) containing increasing proportions of acetone and those fractions which, on the basis of infrared and papergram analysis, were found to contain the desired material were combined and evaporated to dryness. The residue (3.36 g.) was dissolved in 25 ml. of methanol and 25 ml. of water was added to the solution. The solid which separated was isolated by filtration and recrystallized from aqueous methanol. There was thus obtained 0.95 g. of 1-[p - (2,3 - dihydroxypropoxy)phenyl] - 2 - phenyl-6-methoxy-3,4-dihydronaphthalene in the form of a crystalline solid having a melting point of 106.5 to 109° C., undepressed by admixture with a sample of material prepared as described in Example 3.

Repetition of the above procedure, but replacing acetone by methyl ethyl ketone, methyl isobutyl ketone, cyclohexanone, diethyl ketone, paraldehyde, and the like, gives similar results.

Similarly, using the above procedure, but replacing 1-(2,3-dihydroxypropoxy) - 4 - bromobenzene by 1-(2,3-dihydroxybutoxy-, (2,3 - dihydroxypentyloxy - 1)-, and 1-(3,4-dihydroxybutoxy)-4-bromobenzene, gives 1-[p-(2,3-dihydroxybutoxy)phenyl]-, 1-[p - (2,3 - dihydroxypentyloxy)phenyl]- and 1 - [p - (3,4 - dihydroxybutoxy) phenyl]-2-phenyl-6-methoxy - 3,4 - dihydronaphthalene, respectively.

I claim:
1. A compound selected from the class consisting of:
(a) compounds having the formula

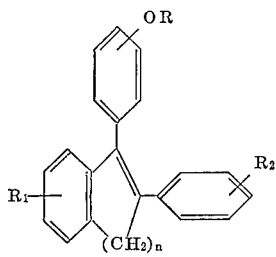

wherein R is —$C_nH_{2n}$—$COOR_5$ wherein $C_nH_{2n}$ represents alkylene from 1 to 12 carbon atoms, inclusive, and $R_5$ is selected from the class consisting of hydrogen and lower-alkyl; $R_1$ and $R_2$ are each selected from the class consisting of hydrogen, lower-alkyl, lower-alkenyl, lower-alkoxy, lower-alkenyloxy, halogen, trifluoromethyl, lower-alkylmercapto, and

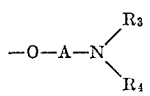

wherein A is an alkylene group containing from 2 to 6 carbon atoms, inclusive, and $R_3$ and $R_4$ are selected from the class consisting of lower-alkyl and lower-alkyl linked together to form, with the attached nitrogen atom, 5 to 7 ring atom saturated heterocyclic radical; and $n$ is an integer from 1 to 2, inclusive;
(b) the acid addition salts with pharmacologically acceptable acids of those compounds of the above formula which contain an amino group; and
(c) the quaternary ammonium salts of those compounds of the above formula which contain a tertiary amino group, the anion of said quaternary ammonium salts being that of a pharmacologically acceptable acid.

2. An indene of the formula:

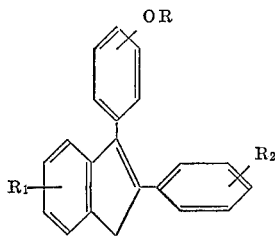

wherein R is —$C_nH_{2n}$—$COOR_5$ wherein $C_nH_{2n}$ represents alkylene from 1 to 12 carbon atoms, inclusive, and $R_5$ is selected from the class consisting of hydrogen and lower-alkyl; $R_1$ and $R_2$ are each selected from the class consisting of hydrogen, lower-alkyl, lower-alkenyl, lower-alkoxy, lower-alkenyloxy, halogen, trifluoromethyl, lower-alkylmercapto, and

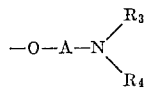

wherein A is an alkylene group containing from 2 to 6 carbon atoms, inclusive, and $R_3$ and $R_4$ are selected from the class consisting of lower-alkyl and lower-alkyl linked together to form, with the attached nitrogen atom, a 5 to 7 ring atom saturated heterocyclic radical.

3. A dihydronaphthalene of the formula:

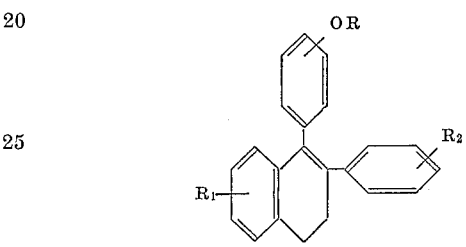

wherein R is —$C_nH_{2n}$—$COOR_5$ wherein $C_nH_{2n}$ represents alkylene from 1 to 12 carbon atoms, inclusive, and $R_5$ is selected from the class consisting of hydrogen and lower-alkyl; $R_1$ and $R_2$ are each selected from the class consisting of hydrogen, lower-alkyl, lower-alkenyl, lower-alkoxy, lower-alkenyloxy, halogen, trifluoromethyl, lower-alkylmercapto, and

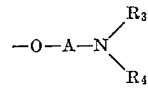

wherein A is an alkylene group containing from 2 to 6 carbon atoms, inclusive, and $R_3$ and $R_4$ are selected from the class consisting of lower-alkyl and lower-alkyl linked together to form, with the attached nitrogen atom, a 5 to 7 ring atom saturated heterocyclic radical.

4. Ethyl 2 - [p - (3,4 - dihydro - 6 - methoxy - 2-phenyl-1-naphthyl)-phenoxy]-2-methylpropionate.

5. 2 - [p - (3,4 - dihydro - 6 - methoxy - 2 - phenyl - 1-naphthyl)phenoxy]-2-methylpropionic acid.

References Cited
UNITED STATES PATENTS 2,944,078  7/1960  Vaterlaus et al. _____ 260—470

LORRAINE A. WEINBERGER, Primary Examiner

D. STENZEL, Assistant Examiner

U.S. Cl. X.R.

260—239, 247.2, 294, 294.3, 326.3, 470, 471, 501.11, 516, 519, 520

UNITED STATES PATENT OFFICE
CERTIFICATE OF CORRECTION

Patent No. 3,519,675          Dated   July 7, 1970

Inventor(s)  Daniel Lednicer

It is certified that error appears in the above-identified patent and that said Letters Patent are hereby corrected as shown below:

Column 3, line 50, for "-alkyl" arysulfonates" read -- -alkyl arylsulfonates" --. Column 4, line 51, for "H=R" read -- R=H --. Column 12, line 24, for "amalgated" read -- amalgamated --. Column 13, line 67, for "hydroxyhenyl" read -- hydroxyphenyl --. Column 14, line 32, for "dimethy" read -- dimethyl --. Column 18, line 9, for "2-(2,6-dimethylphenyl)-4-phenyl-," read -- 2-phenyl-4-(2-fluorophenyl)-, --; line 26, for "21(4-" read -- 2-(4- --. Column 20, line 42, for "577" read -- 5.77 --. Column 26, line 43, for "o-hydroxy-" read -- o-hydroxyphenyl)-2-phenyl-6-methoxy-3,4-dihydronaphthalene. --; line 63, for "where" read -- were --. Column 27, line 20, for "phenoxy[acetate" read -- phenoxy]acetate --. Column 28, line 28, for "$C_{26}T_{28}O_4$" read -- $C_{26}H_{28}O_4$ --; line 49, for "methylmarcaptophenyl" read -- methylmercaptophenyl --; line 59, for "methylmarcapto" read -- methylmercapto --; line 62, for "methylmarcaptophenyl" read -- methylmercaptophenyl --. Column 30, line 18, for "hydroxyphenyl) and the 1-(o-hydroxyphenyl) and 1-(m-hydroxyphenyl) isomers thereof." read -- hydroxyphenyl) isomers thereof. --; line 34, for "1-[3-succinimido" read -- 1-[p-(3-succinimido --. Column 31, line 52, for "pyrrollidinoethoxy" read -- pyrrolidinoethoxy --. Column 32, line 51, for "with acetone and those fractions increasing" read -- with petroleum ether containing increasing --; line 57, for "phenly" read -- phenyl --. Column 35, line 7, for "(2,3-dihydroxypentyloxy-1)-" read -- 1-(2,3-dihydroxypentyloxy)- --.

Signed and sealed this 8th day of June 1971.

(SEAL)

Attest:

EDWARD M. FLETCHER, JR.
Attesting Officer

WILLIAM E. SCHUYLER, JR.
Commissioner of Patents